US012359004B2

(12) United States Patent
Huang et al.

(10) Patent No.: US 12,359,004 B2
(45) Date of Patent: **\*Jul. 15, 2025**

(54) **PROCESSES FOR THE REMOVAL OF RUBBER FROM NON-*HEVEA* PLANTS**

(71) Applicant: Bridgestone Corporation, Chuo-ku (JP)

(72) Inventors: Yingyi Huang, Hudson, OH (US); Mark W. Smale, Hudson, OH (US); Robert W. White, Gilbert, AZ (US); Hiroshi Mouri, Chuo-ku (JP); William M. Cole, Wadsworth, OH (US); Michael R. Hartzell, Gold Canyon, AZ (US); Taigyoo Park, Mesa, AZ (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,521

(22) Filed: Dec. 4, 2023

(65) Prior Publication Data

US 2024/0101722 A1 Mar. 28, 2024

Related U.S. Application Data

(63) Continuation of application No. 17/814,600, filed on Jul. 25, 2022, now Pat. No. 11,834,526, which is a continuation of application No. 16/851,094, filed on Apr. 17, 2020, now Pat. No. 11,396,560, which is a continuation of application No. 15/894,301, filed on Feb. 12, 2018, now Pat. No. 10,626,194, which is a continuation of application No. 15/477,152, filed on Apr. 3, 2017, now Pat. No. 9,890,262, which is a continuation of application No. 15/130,050, filed on Apr. 15, 2016, now Pat. No. 9,611,334, which is a continuation of application No. 14/383,379, filed as application No. PCT/US2013/029451 on Mar. 6, 2013, now Pat. No. 9,315,589.

(60) Provisional application No. 61/660,991, filed on Jun. 18, 2012, provisional application No. 61/661,064, filed on Jun. 18, 2012, provisional application No. 61/661,052, filed on Jun. 18, 2012, provisional application No. 61/607,448, filed on Mar. 6, 2012, provisional application No. 61/607,469, filed on Mar. 6, 2012, provisional application No. 61/607,483, filed on Mar. 6, 2012, provisional application No. 61/607,475, filed on Mar. 6, 2012.

(51) Int. Cl.
| | |
|---|---|
| *C08C 3/02* | (2006.01) |
| *C08C 1/04* | (2006.01) |
| *C08C 2/02* | (2006.01) |
| *C08C 2/06* | (2006.01) |
| *C08G 83/00* | (2006.01) |
| *C08J 11/08* | (2006.01) |
| *C08L 97/02* | (2006.01) |

(52) U.S. Cl.
CPC .............. *C08C 3/02* (2013.01); *C08C 1/04* (2013.01); *C08C 2/02* (2013.01); *C08C 2/06* (2013.01); *C08G 83/00* (2013.01); *C08J 11/08* (2013.01); *C08L 97/02* (2013.01); *C08J 2307/00* (2013.01); *C08L 2205/03* (2013.01)

(58) Field of Classification Search
USPC ....................................................... 528/493
See application file for complete search history.

(56) References Cited

U.S. PATENT DOCUMENTS

| | | |
|---|---|---|
| 702,678 A | 6/1902 | Prampolini |
| 741,258 A | 10/1903 | Lawrence |
| 814,407 A | 3/1906 | Von Stechow |
| 843,567 A | 2/1907 | Bradshaw |
| 957,495 A | 5/1910 | Chute et al. |
| 979,902 A | 9/1910 | Van der Linde |
| 999,493 A | 8/1911 | Ellis |
| 999,708 A | 8/1911 | Ellis |
| 1,003,139 A | 9/1911 | Kelley |
| 1,007,681 A | 11/1911 | Ellis |
| 1,051,987 A | 2/1913 | Chute |
| 1,103,903 A | 7/1914 | Kendall |
| 1,105,568 A | 7/1914 | Kendall |
| 1,135,236 A | 4/1915 | Wheeler et al. |
| 1,161,135 A | 11/1915 | Kaminski et al. |
| 1,167,264 A | 1/1916 | Brooks |
| 1,189,549 A | 7/1916 | Ellis |
| 1,189,550 A | 7/1916 | Ellis |
| 1,242,886 A | 10/1917 | Meyer |

(Continued)

FOREIGN PATENT DOCUMENTS

| | | |
|---|---|---|
| AU | 2012202924 A | 5/1942 |
| CN | 1442193 A | 4/2003 |

(Continued)

OTHER PUBLICATIONS

Response submitted in application No. EP13758291.2 (filed Apr. 14, 2016).
European Search Report in EP application (16205645), dated May 11, 2017.
Response submitted in application No. EP16205645 on Dec. 7, 2017.

(Continued)

*Primary Examiner* — Terressa Boykin
(74) *Attorney, Agent, or Firm* — Meredith E. Hooker; Jenny L. Sheaffer

(57) ABSTRACT

Provided herein are organic solvent-based processes for the removal of rubber from non-*Hevea* plants such as guayule shrubs. By the use of the processes, solid purified rubber can be obtained that contains 0.05-0.5 weight % dirt, 0.2-1.5 weight % ash, and 0.1-4 weight % resin (when it has been dried so as to contain 0.8 weight % volatile matter).

24 Claims, No Drawings

(56) References Cited

U.S. PATENT DOCUMENTS

| | | |
|---|---|---|
| 1,247,814 A | 11/1917 | Garza |
| 1,550,319 A | 8/1925 | Hopkinson |
| 1,671,570 A | 5/1928 | Carnahan |
| 1,695,676 A | 12/1928 | Yeandle |
| 1,735,835 A | 11/1929 | Kohno |
| 1,740,079 A | 12/1929 | Edison |
| 1,753,184 A | 4/1930 | Spence |
| 1,753,185 A | 4/1930 | Spence |
| 1,829,502 A | 10/1931 | Calcott et al. |
| 1,989,502 A | 10/1931 | Calcott et al. |
| 1,833,287 A | 11/1931 | Hadley |
| 1,903,500 A | 4/1933 | Calcott |
| 2,138,895 A | 12/1938 | Wiezevich |
| 2,187,146 A | 1/1940 | Calcott et al. |
| 2,281,336 A | 4/1942 | Stacom |
| 2,339,418 A | 1/1944 | McKay |
| 2,364,394 A | 12/1944 | Sibley |
| 2,373,689 A | 4/1945 | Kenda |
| 2,387,521 A | 10/1945 | Martin |
| 2,390,860 A | 12/1945 | Williams |
| 2,399,156 A | 4/1946 | Stamberger et al. |
| 2,408,853 A | 10/1946 | Hoover et al. |
| 2,410,780 A | 11/1946 | Gracia |
| 2,410,781 A | 11/1946 | Gracia |
| 2,425,011 A | 8/1947 | Smith |
| 2,434,412 A | 1/1948 | Jones |
| 2,459,369 A | 1/1949 | Tint et al. |
| 2,475,141 A | 7/1949 | Jones |
| 2,522,136 A | 9/1950 | Schaffer |
| 2,549,763 A | 4/1951 | Banigan, Jr. et al. |
| 2,572,046 A | 10/1951 | Meeks et al. |
| 2,618,670 A | 11/1952 | Clark |
| 2,665,317 A | 1/1954 | Clark et al. |
| 2,744,125 A | 5/1956 | Meeks et al. |
| 2,864,561 A | 12/1958 | Mark |
| 3,141,281 A | 7/1964 | Guant et al. |
| 3,311,601 A | 3/1967 | Conley |
| 3,376,158 A | 4/1968 | Buser |
| 4,107,902 A | 8/1978 | Suggs |
| 4,122,012 A | 10/1978 | Blasnik |
| 4,136,131 A | 1/1979 | Buchanan |
| 4,159,903 A | 9/1979 | Bauman |
| 4,198,324 A | 4/1980 | Lal et al. |
| 4,243,561 A | 1/1981 | Lal et al. |
| 4,246,001 A | 1/1981 | Bauman |
| 4,269,242 A | 5/1981 | Smith |
| 4,272,436 A | 6/1981 | Lal et al. |
| 4,363,188 A | 12/1982 | Dastoor et al. |
| 4,376,189 A | 3/1983 | Trivette |
| 4,376,835 A | 3/1983 | Schmitt et al. |
| 4,376,853 A | 3/1983 | Gutierrez et al. |
| 4,405,532 A | 9/1983 | Gutierrez et al. |
| 4,410,656 A | 10/1983 | Coran et al. |
| 4,412,031 A | 10/1983 | Kitahara et al. |
| 4,412,041 A | 10/1983 | Kitahura et al. |
| 4,424,171 A | 1/1984 | Gutierrez et al. |
| 4,433,114 A | 2/1984 | Coran et al. |
| 4,434,266 A | 2/1984 | Trivette, Jr. |
| 4,435,337 A | 3/1984 | Kay et al. |
| 4,493,925 A | 1/1985 | Trivette, Jr. |
| 4,496,683 A | 1/1985 | Morita |
| 4,499,243 A | 2/1985 | Rader |
| 4,513,110 A | 4/1985 | Rader |
| 4,525,541 A | 6/1985 | Kitahara et al. |
| 4,526,929 A | 7/1985 | Kishida et al. |
| 4,526,959 A | 7/1985 | Kay et al. |
| 4,530,995 A | 7/1985 | Gutierrez et al. |
| 4,542,191 A | 9/1985 | Kay et al. |
| 4,557,306 A | 12/1985 | Graves |
| 4,559,378 A | 12/1985 | Kay et al. |
| 4,568,711 A | 2/1986 | Kay et al. |
| 4,570,690 A | 2/1986 | Graves |
| 4,585,826 A | 4/1986 | Graves |
| 4,591,631 A | 5/1986 | Beattie |
| 4,591,632 A | 5/1986 | Moore |
| 4,609,336 A | 9/1986 | Stevenson et al. |
| 4,616,068 A | 10/1986 | Schloman, Jr. et al. |
| 4,616,075 A | 10/1986 | Malani et al. |
| 4,621,118 A | 11/1986 | Schloman, Jr. et al. |
| 4,622,365 A | 11/1986 | Schloman, Jr. et al. |
| 4,623,713 A | 11/1986 | Beinor et al. |
| 4,638,028 A | 1/1987 | Lui et al. |
| 4,647,607 A | 3/1987 | Kay et al. |
| 4,677,153 A | 6/1987 | Kitahara et al. |
| 4,678,860 A | 7/1987 | Kuester |
| 4,681,929 A | 7/1987 | Cole et al. |
| 4,684,715 A | 8/1987 | Kay et al. |
| 4,687,810 A | 8/1987 | Coran |
| 4,728,343 A | 3/1988 | Snyder |
| 4,739,037 A | 4/1988 | Kay |
| 4,739,038 A | 4/1988 | Schloman, Jr. |
| 4,751,271 A | 6/1988 | Graves |
| 4,761,446 A | 8/1988 | Graves et al. |
| 4,762,870 A | 8/1988 | Graves et al. |
| 4,778,857 A | 10/1988 | Graves et al. |
| 4,786,683 A | 11/1988 | Schloman, Jr. et al. |
| 4,792,583 A | 12/1988 | Coran |
| 4,804,741 A | 2/1989 | Verbiscar et al. |
| 4,822,845 A | 4/1989 | Graves et al. |
| 4,829,117 A | 5/1989 | Schloman, Jr. et al. |
| 4,927,887 A | 5/1990 | Tate |
| 4,975,497 A | 12/1990 | Tate et al. |
| 4,983,729 A | 1/1991 | Sikora |
| 4,988,388 A | 1/1991 | Schloman |
| 5,234,564 A | 8/1993 | Smith |
| 5,247,009 A | 9/1993 | Kitahara |
| 5,272,203 A | 12/1993 | Joyner |
| 5,306,862 A | 4/1994 | Cappell et al. |
| 5,321,111 A | 6/1994 | Ji |
| 5,362,807 A | 11/1994 | Nogura et al. |
| 5,379,948 A | 1/1995 | Teppo |
| 5,411,147 A | 5/1995 | Bond |
| 5,453,051 A | 9/1995 | Schlough |
| 5,468,539 A | 11/1995 | Crivelli |
| 5,473,024 A | 12/1995 | Thames et al. |
| 5,580,942 A | 12/1996 | Cornish |
| 5,599,868 A | 2/1997 | Bohm et al. |
| 5,616,075 A | 4/1997 | Winstanley et al. |
| 5,633,433 A | 5/1997 | Backhaus et al. |
| 5,645,234 A | 7/1997 | Del Zotto |
| 5,651,953 A | 7/1997 | Yokohoma et al. |
| 5,717,050 A | 2/1998 | Cornish |
| 5,872,186 A | 2/1999 | Ang |
| 5,998,512 A | 12/1999 | Schloman |
| 6,014,998 A | 1/2000 | Mowdood |
| 6,054,525 A | 4/2000 | Schloman et al. |
| 6,132,711 A | 10/2000 | Backhaus et al. |
| 6,231,970 B1 | 5/2001 | Andersen et al. |
| 6,382,425 B1 | 5/2002 | Brickner |
| 6,399,673 B1 | 6/2002 | Thames et al. |
| 6,482,884 B1 | 11/2002 | Schaal |
| 6,492,447 B2 | 12/2002 | Chestnut et al. |
| 6,645,747 B1 | 11/2003 | Hallahan et al. |
| 6,726,025 B1 | 4/2004 | Huskey |
| 6,734,245 B2 | 5/2004 | Baranek |
| 6,787,590 B2 | 9/2004 | Nakayama et al. |
| 6,818,676 B2 | 11/2004 | Koffler et al. |
| 7,026,678 B2 | 4/2006 | Coursey |
| 7,205,456 B2 | 4/2007 | Hallahan et al. |
| 7,228,881 B1 | 6/2007 | Smith |
| 7,259,231 B2 | 8/2007 | Cornish et al. |
| 7,540,438 B2 | 6/2009 | Buranov |
| 7,629,397 B2 | 12/2009 | McDonald et al. |
| 7,790,036 B2 | 9/2010 | Cornish et al. |
| 7,851,210 B2 | 12/2010 | Darling |
| 7,923,039 B2 | 4/2011 | Cornish et al. |
| 7,955,611 B2 | 6/2011 | Brown et al. |
| 8,013,213 B2 | 9/2011 | Mau et al. |
| 8,080,358 B2 | 12/2011 | Murakami |
| 8,241,873 B2 | 8/2012 | Diner et al. |
| 8,268,121 B2 | 9/2012 | Blount |
| 8,815,965 B2 | 8/2014 | Cole et al. |
| 9,138,660 B2 | 9/2015 | Yahamoto |
| 9,315,589 B2 * | 4/2016 | Huang .................. C08G 83/00 |

(56) References Cited

U.S. PATENT DOCUMENTS

| | | | |
|---|---|---|---|
| 9,328,211 B2 | 5/2016 | Nemato et al. | |
| 9,546,224 B2 | 1/2017 | Cole et al. | |
| 9,562,720 B2 | 2/2017 | Huang et al. | |
| 9,567,457 B2 | 2/2017 | Huang et al. | |
| 9,611,334 B2* | 4/2017 | Huang | C08C 1/04 |
| 9,637,562 B2 | 5/2017 | Huang et al. | |
| 9,890,262 B2* | 2/2018 | Huang | C08C 2/06 |
| 10,023,660 B2 | 7/2018 | Randall et al. | |
| 10,113,011 B2 | 10/2018 | Cole et al. | |
| 10,132,563 B2 | 11/2018 | Huang et al. | |
| 10,138,304 B2 | 11/2018 | Huang et al. | |
| 10,287,367 B2 | 5/2019 | Huang et al. | |
| 10,316,110 B2 | 6/2019 | Huang et al. | |
| 10,471,473 B2 | 11/2019 | Huang et al. | |
| 10,626,194 B2* | 4/2020 | Huang | C08C 2/02 |
| 11,028,188 B2 | 6/2021 | Huang et al. | |
| 11,267,019 B2 | 3/2022 | Huang et al. | |
| 11,396,560 B2* | 7/2022 | Huang | C08C 2/02 |
| 11,834,526 B2* | 12/2023 | Huang | C08C 2/06 |
| 2002/0006987 A1 | 1/2002 | Nakayama | |
| 2003/0138403 A1 | 7/2003 | Drustrup | |
| 2004/0265343 A1 | 12/2004 | Hill | |
| 2005/0011812 A1 | 1/2005 | Nelson | |
| 2005/0050759 A1 | 3/2005 | Chandran et al. | |
| 2006/0070167 A1 | 4/2006 | Eng et al. | |
| 2006/0106183 A1 | 5/2006 | Cornish et al. | |
| 2006/0149015 A1 | 7/2006 | Cornish et al. | |
| 2006/0217512 A1 | 9/2006 | Mau et al. | |
| 2006/0225144 A1 | 10/2006 | Hallahan et al. | |
| 2007/0265408 A1 | 11/2007 | Cornish et al. | |
| 2007/0276112 A1 | 11/2007 | Buranov | |
| 2008/0015336 A1 | 1/2008 | Cornish et al. | |
| 2008/0172998 A1 | 7/2008 | Fraley et al. | |
| 2008/0221246 A1 | 9/2008 | Imam et al. | |
| 2008/0300526 A1 | 12/2008 | Gumbs | |
| 2008/0317933 A1 | 12/2008 | Williamson | |
| 2009/0054595 A1 | 2/2009 | Cornish et al. | |
| 2009/0099309 A1 | 4/2009 | Gumbs | |
| 2009/0099327 A1 | 4/2009 | Cornish et al. | |
| 2009/0163689 A1 | 6/2009 | Cornish et al. | |
| 2009/0191243 A9 | 7/2009 | Hill et al. | |
| 2009/0199425 A1 | 8/2009 | Taylor | |
| 2009/0256375 A1 | 10/2009 | Haskins | |
| 2010/0210745 A1 | 8/2010 | McDaniel et al. | |
| 2011/0021743 A1 | 1/2011 | Cornish et al. | |
| 2011/0054051 A1 | 11/2011 | Cole et al. | |
| 2011/0275142 A1 | 11/2011 | Wade et al. | |
| 2013/0029009 A1 | 1/2013 | Darling et al. | |
| 2013/0067808 A1 | 3/2013 | Stachon et al. | |
| 2014/0336288 A1 | 11/2014 | Cole et al. | |
| 2015/0073113 A1 | 3/2015 | Huang et al. | |
| 2015/0126673 A1 | 5/2015 | Randall et al. | |
| 2015/0136882 A1 | 5/2015 | Huang et al. | |
| 2015/0184933 A1 | 7/2015 | Huang et al. | |
| 2015/0190848 A1 | 7/2015 | Huang et al. | |
| 2017/0081429 A1 | 5/2017 | Cole et al. | |
| 2017/0146291 A1 | 5/2017 | Huang et al. | |
| 2017/0152326 A1 | 6/2017 | Huang et al. | |
| 2017/0226309 A1 | 8/2017 | Huang et al. | |
| 2019/0284309 A1 | 9/2019 | Huang et al. | |
| 2022/0356273 A1 | 11/2022 | Huang et al. | |

FOREIGN PATENT DOCUMENTS

| | | |
|---|---|---|
| CN | 1860850 A | 11/2006 |
| CN | 101671404 A | 3/2010 |
| CN | 101906176 A | 12/2010 |
| EA | 2011170418 A1 | 12/2011 |
| EP | 87109 A1 | 8/1983 |
| EP | 100434 A2 | 2/1984 |
| EP | 105822 A2 | 4/1984 |
| EP | 164137 A2 | 12/1985 |
| EP | 179211 A1 | 4/1986 |
| EP | 180716 A1 | 5/1986 |
| EP | 87109 B1 | 10/1986 |
| EP | 87109 B2 | 10/1986 |
| EP | 0039910 B1 | 4/1987 |
| EP | 105822 B1 | 6/1988 |
| EP | 180716 B1 | 4/1989 |
| EP | 100434 B1 | 9/1989 |
| EP | 164137 B1 | 6/1990 |
| EP | 476641 B1 | 3/1992 |
| EP | 491229 B1 | 6/1992 |
| EP | 0509768 A2 | 10/1992 |
| EP | 179211 B1 | 7/1998 |
| EP | 938350 B1 | 11/2006 |
| EP | 1752277 A2 | 2/2007 |
| EP | 675202 A1 | 10/2009 |
| EP | 2183303 A1 | 5/2010 |
| EP | 1969036 B1 | 3/2011 |
| GB | 545410 A | 5/1942 |
| GB | 2164341 A | 3/1986 |
| GB | 2174403 A | 11/1986 |
| JP | S61-264005 A | 11/1986 |
| JP | 62000502 A | 1/1987 |
| JP | H06-100704 A | 4/1994 |
| JP | H08-283309 A | 10/1996 |
| JP | H11-012306 A | 1/1999 |
| JP | 2003-040902 A | 2/2003 |
| JP | 2003-313366 A | 11/2003 |
| JP | 2006348607 A | 12/2006 |
| JP | 2007-126676 A | 5/2007 |
| JP | 2007224067 A | 9/2007 |
| RU | 2027746 C1 | 1/1995 |
| SU | 15590 A1 | 6/1930 |
| SU | 47819 A1 | 7/1936 |
| SU | 47820 A1 | 7/1936 |
| SU | 50447 A1 | 11/1936 |
| SU | 66332 A1 | 11/1945 |
| SU | 68448 A1 | 11/1946 |
| SU | 72175 A1 | 11/1947 |
| SU | 1131883 A1 | 12/1984 |
| WO | 1981003255 A1 | 11/1981 |
| WO | 9803255 A1 | 1/1998 |
| WO | 2001010946 A2 | 2/2001 |
| WO | 2001049257 A1 | 7/2001 |
| WO | 2009054595 A1 | 4/2009 |
| WO | 2009095059 A1 | 8/2009 |
| WO | 2009129249 A2 | 10/2009 |
| WO | 2013134429 A1 | 9/2013 |
| WO | 2013134430 A1 | 9/2013 |
| WO | 2013173625 A1 | 11/2013 |
| WO | 2013192182 A1 | 12/2013 |
| WO | 2013192217 A1 | 12/2013 |
| WO | 2013192227 A1 | 12/2013 |
| WO | 2015038707 A1 | 3/2015 |

OTHER PUBLICATIONS

Grant notice issued in application No. EP16205645 on Mar. 23, 2018.

Supplemental European Search Report in EP national stage (EP13757665.8) from PCT/US2013/029449), dated Oct. 26, 2015.

Response submitted in aplication No. EP13757665.8 (filed Apr. 14, 2016).

European Search Report and Opinion in EP application 17168837, dated Jun. 30, 2017 and May 29, 2017.

Response submitted in application No. EP 17168837.7 on Mar. 13, 2018.

Office action issued in RU application No. 2014140181 Feb. 14, 2017.

Office action issued in RU application No. 2014140181 Feb. 10, 2017.

Office action issued May 4, 2015 in U.S. Appl. No. 14/383,379.

Response filed Jul. 31, 2015 in U.S. Appl. No. 14/383,379.

Notice of Allowance issued Aug. 19, 2015 in U.S. Appl. No. 14/383,379.

Notice of allowance issued Feb. 29, 2016 in U.S. Appl. No. 14/383,379.

Response submitted by Jul. 7, 2016 in U.S. Appl. No. 14/383,379.

Response submitted Jul. 7, 2016 in U.S. Appl. No. 14/383,380.

Final Office Action issued July 211, 2016 in U.S. Appl. No. 14/383,380.

(56) References Cited

OTHER PUBLICATIONS

Office action issued Apr. 12, 2016 in U.S. Appl. No. 14/383,380.
Response submitted Sep. 1, 2016 in U.S. Appl. No. 14/383,380.
Notice of Allowance issued Dec. 27, 2017 in U.S. Appl. No. 14/383,380.
Office action issued Jul. 29, 2016 in U.S. Appl. No. 15/130,050.
Response filed Oct. 13, 2016 in U.S. Appl. No. 15/130,050.
Notice of allowance issued Nov. 21, 2016 in U.S. Appl. No. 15/130,050.
Non-final office action rejection from U.S. Appl. No. 15/477,152 issued Jun. 28, 2017.
Response filed Sep. 28, 2017 in U.S. Appl. No. 15/477,152.
International Preliminary Report on Patentability and Written Opinion (PCT Application No. PCT/US2013/029451), dated Sep. 2, 2014.
Search Report from PCT/US2014/029451, dated Jun. 21, 2013.
International Preliminary Report on Patentability and Written Opinion (PCT Application No. PCT/US2013/029449), dated Sep. 22, 2014.
Search Report from PCT/US2014/029449, dated Jun. 21, 2013.
Examination report issued Mar. 2016 in AU application 2013262725.
Response filed in AU application 2013262725 (Aug. 10, 2016).
Second examination report issued Aug. 23, 2016 in AU application 2013262725.
Response filed in AU application 2013262725 (Sep. 12, 2016).
Allowance issued Sep. 23, 2016 in AU application 2013262725.
Examination report issued in AU application 2017200069 in Aug. 2017.
Response submitted in AU application 2017200069 in Mar. 2018.
Grant notice issued in AU application 2017200069 in Apr. 2018.
First Office Action in Chinese application 201380031854.X (issued Sep. 11, 2015).
Second Office Action in Chinese application 201380031854.X (issued May 13, 2016).
Third Office Action in Chinese application 201380031854.X (issued Dec. 6, 2016).
Supplemental Search Report and opinion issue May 2016 in application EP 13792144.0.
Response filed in application EP 13792144.0 on Aug. 30, 2016.
Office action issued in RU application 2014150798 on Apr. 5, 2017.
Non-final office action from U.S. Appl. No. 14/401,749, issued Aug. 24, 2017.
Response filed in U.S. Appl. No. 14/401,749 in Nov. 2017.
Notice of allowance issued in U.S. Appl. No. 14/401,749 in Mar. 2018.
International Preliminary Report on Patentability and Written Opinion from PCT/US2013/041422, dated Nov. 18, 2014.
Search Report from PCT/US2013/041422, dated Nov. 21, 2013.
Third party observations submitted in PCT/US2013/041422 on Nov. 21, 2014.
Examination report issued May 2016 in AU application 2013277296.
Van Beillen, Jan B, et al., "Guayule and Russian dandelion as alternative sources of natural rubber," CRC Critical Reviews in Biotechnology, CRC Press, vol. 27, No. 1, Jan. 2007. pp. 217-231.
Vincent Corporation, Screw Press Operating Hints, Sep. 17, 2009.
Agricultural Encyclopedia of China (Volume of Crops), vol. one, compiled by Editorial Dept. for Agricultural Encyclopedia of China, pp. 791-720, China Agricultural Press, Apr. 1991.
Australian Patent Exam Report for 2009236328 dated Jul. 2, 2013.
Second Australian Patent Exam Report 2009236328 dated Jan. 30, 2014.
Response to Australian Office Action, (dated Dec. 23, 2013).
First Office Action in Chinese Application No. 2009801224454 (dated Mar. 27, 2012).
Second Office Action in Chinese Applicaiton No. 2009801224454 (dated Jun. 27, 2012).
EP 09733501 Communication Pursuant to Article 94(3) EPC, (dated May 10, 2012).
Extended Search Report, EP 09733501 (dated Aug. 19, 2011).
Response to the Extended European Search Report dated Mar. 8, 2012.
Response to European Office Action dated Sep. 20, 2012.
Communication pursuant to Article 94(3) EPC dated Jan. 15, 2013.
Invitation pursuant to Article 94(3) and Rule 71(1) EPC dated Feb. 8, 2013.
Response to EPO dated Apr. 9, 2013.
Notification of Intent to Grant from European Patent Office dated Jun. 12, 2013.
Japanese Office Action for 2011-505140 datred Jan. 7, 2014.
Non-final Office Action issued in U.S. Appl. No. 12/937,284 on Dec. 11, 2012.
Response filed in U.S. Appl. No. 12/937,284 on Jun. 13, 2013.
Final Office Action issued in U.S. Appl. No. 12/937,284 on May 31, 2013.
Response filed in U.S. Appl. No. 12/937,284 on Oct. 30, 2013.
Non-final Office Action issued in U.S. Appl. No. 12/937,284 on Nov. 13, 2013.
Response filed un U.S. Appl. No. 12/937,284 on Mar. 31, 2014.
Notice of allowance issued in U.S. Appl. No. 12/937,284 on Apr. 16, 2014.
Non-final Office Action issued in U.S. Appl. No. 14/338,581 on Feb. 3, 2016.
Response filed in U.S. Appl. No. 14/338,581 on Apr. 19, 2016.
Notice of Allowance issued in U.S. Appl. No. 14/338,581 on May 2, 2016.
RCE filed on Aug. 2, 2016 in U.S. Appl. No. 14/338,581.
Notice of Allowance issued in U.S. Appl. No. 14/338,581 on Aug. 30, 2016.
Non-final office action issued in U.S. Appl. No. 15/364,527 on Feb. 13, 2018.
International Preliminary Report on Patentability and Written Opinion (corresponding PCT Application No. PCT/US2009/040543); Authorized Officer Athina Nckitas-Etienne; (8 pages) (dated Oct. 19, 2010).
International Search Report (corresponding PCT Applicaiton No. PCT/US2009/040543); Authorized Officer Kang, Hyunk Seok; (2 pages) (dated Nov. 9, 2009).
Examination report issued in application No. AU2013230936 (issued Feb. 26, 2016).
Response filed on May 16, 2016 in application No. AU2013230936.
Examination report issued in application No. AU2016222428 (issued Jan. 2017).
Response filed in Aug. 2017 in AU application No. 2016222428.
Response filed on Apr. 22, 2016 in AU application No. 2013230935.
Examination report issued in application No. AU2013230935 (issued Feb. 25, 2016).
Examination report issued in application No. AU2016213719 (issued Jan. 2017).
Response filed in application No. AU2016213719 in Mar. 2017.
Office Action issued in application No. CN2013-80021313.9 (issued on Jun. 2, 2015).
Office Action issued in application No. CN2013-80021313.9 (issued on Nov. 3, 2015).
Office Aciton issued in application No. CN2013-80021313.9 (issued Jan. 18, 2016).
Office Action issued in application No. CN2013-80021313.9 (issued Dec. 2016).
Third Office Action issued May 2016 in CN application No. 201380023740.0.
Office Action issued in application No. CN20130023740.0 (issued May 26, 2015).
Office Action issued in application No. CN20130023740.0 (issued Dec. 16, 2015).
Fourth Office Action issued in application No. CN20130023740.0 (issued Oct. 2016).
Decision of Rejection issued in application No. CN20130023740.0 (issued in May 2017).
Supplemental European Search Report in EP national stage (EP13758291.2) from PCT/US2013/02951, dated Oct. 26, 2015.
Kim, Dong Seok, International Search Report with Written Opinion from PCT/US2013/046328, 12 pp. (Oct. 11, 2013).
International Products Brochure 2007.

(56) References Cited

OTHER PUBLICATIONS

Abstract—Week 200365 Thomson Scientific, London, GB; AN 2003-682828; XP000002567182, JP 2003 040902 A (Nitto Denko Corp) (dated Feb. 13, 2003).
Adler, R.J., et al., Freeze Coagulation of BAS Latex, Ind. Eng. Chem. Res. vol. 36 pp. 2156-2162 (dated 1997).
ASTM International, Standard Test Methods for Rubber from Natural Sources—Chemical Analysis, D 1278, 2002, pp. 246-251.
Bedane, G.M., et al., Development and Evaluation of a Guayule Debarker, Industrial Crops and Products, vol. 34, pp. 1256-1261 (2011).
Beintema, Nienke, Rubber From Dandelions and Shrubs, Wageningen World, No. 1, pp. 16-17, 2012.
Belmares, H. et al., New Rubber Peptizers and Coatings Derived from Guayule Resin, Industrial and Engineering Chemistry: Product Research and Development, vol. 19, pp. 107-111 (1980).
Benedict, H.M. The Effect of Waste Products From the Guayule Rubber Mill on the Growth of Various Crops. Journal of the American Society of Agronomy, vol. 40: pp. 1005-1016 (1948).
Bhowmick, et al. Effect of Resin Components on the Degradation of Guayule Rubber, Journal of Applied Polymer Science, vol. 30, pp. 2367-2388 (dated 1985).
Biosolids Dewatering, Promotional Material, FKC Co. Ltd., accesed Jul. 30, 2015 at http://fkescrewpress.com/docs/fkcbiosolids2.pdf.
Bonner, J., and A.W. Galson. Toxic Substances From the Culture Media of Guayule Which May Inhibit Growth. Botanical Gazette, vol. 106; pp. 185-198 (1944).
Buranov, Anvar U., et al., Extraction and Characterization of Latex and Natural Rubber from Rubber-Bearing Plants, J. Agric. Food Chem. 2010, 58, 734-743.
Buranov, Anvar, et al., "Rubber-Bearing Plants of Central Asia," Conf. Title Industrial Crops and Rural Development, Conf. date Sep. 17, 2005.
Cataldo, F. Guayule Rubber: A New Possible World Scenario for the Production of Natural Rubber Progress in Rubber and Plastics Technology, vol. 16, No. 1 (dated 2000).
Centrifugation and Centrifuges, Lenntech, accessed Dec. 6, 2011 at http://www.lenntech.com/library/clarification/centrifugation.htm.
Chang, M., and G.T. Tsao. Hydrolysis of Guayule Cellulose for Alcohol Production. E.C. Gregg, J.L. Tipton and H.T. Huang, ends., Proceedings of the Third International Guayule Conference, Pasadena, Calif., Guayule Rubber Soc.: Riverside, Calif., pp. 211-224 (1983).
Crown Model IV and Model V Extractors, Flyer, Crown Iron Works Company, accessed Jul. 30, 2015 at http://www.crowniron.com/userfiles/image/specialty%20extractor%20insert1.pdf (dated Nov. 2006).
Curtis, JR., "Distribution of Rubber and Resins in Guayule", Plance Physiology, vol. 22, No. 4, pp. 333-359 (dated Oct. 1947).
Decanters from GEA Westfalia Separator, Mechanical Separation, GE Westfalia Separator, www.westfaliaseparator.com (2010).
Doering, "Guayule Rubber in Tires and Tubes, Service Tests in Which the Rubber was Exclusively Guayule", Industrial and Engineering Chemistry, vol. 26, No. 5, pp. 541-543, (dated May 1934).
Extraction Decanters from GEA Westfalia Separator, GEA Westfalia Separator Group, accessed May 30, 2012 at http://www.westfalia-separator.com/products/decanters/extraction-decanters.html.
Gelling, I.R. Modification of Natural Rubber Latex With Peracetic Acid. Rubber and Technology. bo. 58, pp. 86-96. (1985).
Himayah H. Naqvi and George P. Hanson; American Journal of Botany, vol. 69, No. 6 (Jul. 1982) pp. 985-989; Germination and Growth Inhibitors in Guayule (Parthenium argentatum Gray) Chaff and Their Possible Influence in Seed Dormancy.
Jordi Labs, printout from http://lifescience.ca/DAT/CATALOGUE/211~v~Polymer_Solubility_Index.pdf, printed Aug. 5, 2014.
Keller, B.A., editor, Rubber and Rubber-Plants (book), pp. 408-410, published 1936.
Keller. R.W., D.S. Winkler, and H.L. Stephens. Degradative Effects of Guayule Resin on Natural Rubber. Rubber Chemistry and Technology. vol. 54, pp. 115-123, (1981).

King, R.J., and D.M. Mondimore. HPLC Procedure for the determination of Free Sulfur in Natural Rubber Formulations, Rubber Chemistry and Technology. vol. 60, pp. 716-720 (1987).
Kuester, J.L., C.M. Fernandez, T.C. Wang, and G. Heath. Liquid Hyrdrocarbon Fuel Potential of Agricultural Materials. In R.P. Overend, T.A. Milne, and L.K. Mudge, eds., International Conference on Fundamentals of Thermochemical Biomass Conversion, 1982, Estes Park Colo., Elsevier Applied Science: London, pp. 875-895 (1985).
Kuester, J.L., Liquid Hydrocarbon Fuels From Biomass (1981).
Makitra, et al., "Dependence of Natural Rubber Swelling Index Upon Organic Solvents Properties", Chemistry & Chemical Technology, vol. 5, No. 1, pp. 19-24 (dated 2011).
McIntyre, et al., "Guayule Rubber," Handbook of Elastomers, pp. 1-27 (dated 2001).
Meeker, T.R.; Specialty Isoprene Based Polymers—Derivatives From the General Purpose Polymers; Doc. 1848; Spring 1985.
Murphy, J. Brad and C.A. Stutte; Analytical Biochemistry 86, 220-228 (1978); Analysis for Substituted Benzoic and Cinnamic Acids Using High-Pressure Liquid Chromatography.
Presentation pages by Schloman, W.W., Jr. undated (submitted via third party observations in PCT/US2013/041422 on Aug. 6, 2014).
Reynolds, Cynthia, "The Russians Are Coming," www.macleans.ca/2011/08/11/the-russians-are-coming, Aug. 11, 2011.
Rubber Developments vol. 39 No. 1, pp. 23-24; Your Questions Anssered (1986).
Rysselberge, Jacques Van, Utilisation De Bitumes Elastomeres (1976).
Schloman, W.W. Jr., et al., Seasonal Effects on Guayule Resin Composition, J. Agricultural and Food Chemistry, vol. 34, pp. 177-179 (1986).
Schloman, W.W. Jr et al., Rubber Additives Derived from Guayule Resin, Industrial and Eng'r Chem. Research, vol. 27, pp. 712-716 (1988).
Schloman, W.W. Jr., et al., Guayule Byproduct Evaluation: Extract Characterization, J. Agricultural and Food Chemistry, vol. 31 pp. 873-876 (1983).
Schloman, W.W. Jr., et al., Water Stress and Seasonal Effects on Rubber Quality in Irrigated Guayule, J. Agricultural and Food Chemistry vol. 34, pp. 683-685 (1986).
Schloman, W.W. Jr., "Processing Guayule for Latex and Bulk Rubber," Industrial Crops and Products, vol. 22 No. 1, pp. 41-47, 2005.
Screw Press Operating Hints (CC Series), Vincent Corporation, accessed May 31, 2012 at http://www.vincentcorp.com/screw_press_operating_hints_%28cp%20series%29 (dated Mar. 26, 2009).
Screw Press, Wikipedia, accessed May 28, 2012 at http://wikipedia.org/wiki/screw_press.
Sin Siew Weng, Some Traditional and New Uses of Skim Rubber, Rubber Research Institute of Malaysia, Proceedings of RRIM Planters Conference (1981).
Stillage Dewatering Screw Press, Promotional Material, FKC Co. Ltd., accessed Jul. 30, 2015 at http://www.fkescrewpress.com/docs/spentgrain_stillageflyerweb.pdf.
Subramaniam, A., J. Rubb. Res. Inst. Malaysia 25(2), 61-68; estimation of Aldehyde Groups in Natural Rubber with 2, 4-dinitrophenylhydrazine (1977).
Tanaka, Y. Structural Characterization of Natural Polyisoprenes: Solve the Mystery of Natural Rubber Based on Structural Study Rubber Chemistry and Technology vol. 74, 355, (dated 2001).
Touzinsky, G.F.; Northern Regional Research Center; Agricultural Research, Science and Education Administration; Guayule as a Source of papermaking Fiber, 5th International Dissolving Pulps Conference, Vienna, pp. 311-315 (1980).
Response filed Jul. 1, 2016 in AU application 2013277296.
Allowance issued Aug. 2016 in AU application 2013277296.
Second office action from application CN201380032071.3, issued Aug. 29, 2017.
First office action from application CN201380032071.3, issued Feb. 7, 2017.
Supplemental Search Report and opinion issued Feb. 2016 in EP application 13807874.2.
Response submitted Jul. 12, 2016 in EP application 13807874.2.

(56) References Cited

OTHER PUBLICATIONS

Office action issued in RU aplication 2015101234 on Mar. 29, 2017.
Notice of allowance issued May 2016 in U.S. Appl. No. 14/409,132.
Notice of allowance issued Nov. 2016 in U.S. Appl. No. 14/409,132.
Notice of allowance issued Feb. 27, 2018 in U.S. Appl. No. 15/424,224.
International Preliminary Report on Patentability and Written Opinion from PCT/US2013/046409, dated Dec. 23, 2014.
Search report from PCT/US2013/046409, dated Oct. 12, 2013.
Examination report issued May 2, 2016 in AU application 2013277335.
Response submitted Jul. 1, 2016 in AU application 2013277335.
Allowance issued Aug. 2016 in AU application 2013277335.
Office action issued in application No. CN2013-80032039.5 (issued Sep. 1, 2015).
Second Office Action issued May 2016 in application No. CN2013-80032039.5.
Third Office Action issued Nov. 2016 in application No. CN2013-80032039.5.
Supplemental Search Report and opinion issued Feb. 2016 in EP application 13806430.8.
Response filed Jun. 23, 2016 in EP application 13806430.8.
Non-final rejection issued in U.S. Appl. No. 14/409,117 on Jan. 25, 2018.
Response filed in U.S. Appl. No. 14/409,117 on Apr. 25, 2018.
International Preliminary Report on Patentability and Written Opinion from PCT/US13/46328, dated Dec. 23, 2014.
Examination Report issued Feb. 2016 in AU application 2013277286.
Response filed May 2016 in AU application 2013277286.
Allowance issued Jun. 2016 in AU application 2013277286.
Examination report issued Jun. 2017 in AU application 2013235014.
Office Action issued in application No. CN2013-80032056.9 (issued Sep. 6, 2015).
Second office action issued May 2016 in application No. CN2013-80032056.9.
Third office action issued in application No. CN2013-80032056.9 (issued Nov. 2016).
Supplemental Search Report and opinion issued Dec. 2015 in EP application 13807611.2.
Response filed May 19, 2016 in EP application 13807611.2.
Grant notice issued Sep. 2016 in EP application 13807611.2.
Search report from EP application 17152493.7 issued May 2017.
Response filed in EP application 17152493.7 Oct. 16, 2017.
Grant notice issued Jan. 2018 in EP application 17152493.7.
Office action issued in application RU2015101287, Apr. 2017.
Office action issued in application RU2015101287, Jul. 2017.
Non-final office action issued in U.S. Appl. No. 14/409,124 on Jan. 25, 2018.
Response filed in U.S. Appl. No. 14/409,124 on Apr. 25, 2018.
Search Report from PCT/US13/46380, dated Oct. 9, 2013.
International Preliminary Report on Patentability and Written Opinion from PCT/US13/46380, dated Dec. 23, 2013.
Office action from U.S. Appl. No. 14/483,455, issued Apr. 27, 2016.
Response filed in U.S. Appl. No. 14/483,455 on Aug. 26, 2016.
Final Office Action from U.S. Appl. No. 14/483,455, issued Sep. 16, 2016.
Response filed in U.S. Appl. No. 14/483,455 on Sep. 22, 2016.
Notice of allowance issued in U.S. Appl. No. 14/483,455 on Sep. 29, 2016.
Third party submission including statements of relevance submitted in U.S. Appl. No. 15/430,938 on Aug. 24, 2017.
International Search Report with Written Opinion from PCT Application No. PT/US2014/055086, Feb. 5, 2015.
Office action issued in application CA2876958 on Jul. 17, 2020.
Response filed in application EP13806430.8 on Jan. 13, 2021.
Office action issued in application EP 13806430.8 on Sep. 30, 2020.
Non-final office action issued in U.S. Appl. No. 16/433,590 on Oct. 23, 2020.
Response filed in U.S. Appl. No. 16/433,590 on Jan. 22, 2021.
Notice of allowance issued in U.S. Appl. No. 16/433,590 on Feb. 5, 2021.
Notice of allowance issued in U.S. Appl. No. 16/662,649 on Oct. 26, 2021.
Response filed in U.S. Appl. No. 16/662,649 on Sep. 14, 2021.
Non-final Office action from U.S. Appl. No. 16/662,649, mailed Jun. 14, 2021.
Non-final Office action from U.S. Appl. No. 16/851,094, mailed Aug. 17, 2021.
Response filed in U.S. Appl. No. 16/851,094 on Nov. 17, 2021.
Notice of allowance from U.S. Appl. No. 16/851,094, mailed Dec. 8, 2021.
Office action received from EPO in EP application No. 19173187.6, mailed Jul. 2, 2021.
Response filed at EPO in EP application No. 19173187.Nov. 6, 10, 2021.
Office action issued in RU application 2017140651 on Mar. 4, 2021.
Office action issued in RU application 2017130331 on Dec. 15, 2020.
Office action received from EPO in EP application 13806430.8, mailed Apr. 1, 2022.
Communication from EPO in EP application 13806430.8, mailed Aug. 3, 2022.
Response filed in EP application 13806430.8 on Oct. 11, 2022.
Non-final office action in U.S. Appl. No. 17/653,764, issued Mar. 3, 2023.
Response filed in U.S. Appl. No. 17/653,764 on May 31, 2023.
Exam Report from Australian patent application 2014210597 issued on Sep. 1, 2015.
Response filed in U.S. Appl. No. 15/498,983 on Jan. 9, 2019.
Notice of allowance from U.S. Appl. No. 15/498,983 issued Feb. 1, 2019.
Response filed in Australian patent application 2014210597 on Feb. 15, 2016.
Response filed in Australian patent application 2009236328 on Apr. 29, 2014.
Notice of allowance from Australian patent application 2009236328 issued Jun. 4, 2014.
Notice of allowance issued in U.S. Appl. No. 15/364,527 on Jun. 27, 2018.
Extended European Search Report and Opinion from European patent application No. 18192589.2 issued Jan. 17, 2019.
Response filed in European patent application No. 18192589.2 on Apr. 10, 2019.
Notice of allowance for Canadian patent application 2866432 issued Apr. 4, 2019.
Office action issued in U.S. Appl. No. 15/430,938 on Jul. 20, 2018.
Response filed in U.S. Appl. No. 15/430,938 on Dec. 20, 2018.
Response filed in European patent application 18205670.5 on Nov. 8, 2019.
Office action in Canadian patent application 2866427 issued Apr. 8, 2019.
Response filed in Canadian patent application 2866427 on Oct. 8, 2019.
Response filed in Australian patent application 2016213719 on Mar. 29, 2019.
Notice of allowance in Canadian patent application 2873783 issued on Jun. 6, 2019.
Office action issued in Chinese patent application 2017-10590888.2 on May 5, 2018.
Notice of allowance issued in U.S. Appl. No. 15/430,938 on Jan. 22, 2019.
Notice of allowance issued in U.S. Appl. No. 15/430,938 on Feb. 21, 2019.
Examination report from application AU 2018-226498, dated Jun. 2019.
Intent to grant issued in European patent application 17168837.7 on May 29, 2018.
Intent to grant issued in European patent application 13758291 on Aug. 4, 2016.
Office action issued in Canadian patent application 2876958 on Jun. 18, 2019.
Fourth office action issued in Chinese patent application 201380032071.3 on Sep. 26, 2018.

(56) References Cited

OTHER PUBLICATIONS

Decision of Rejection issued in Chinese patent application 201380032071.3 on Mar. 1, 2019.
Notice of intent to grant issued in European patent application 13807847.2 on Nov. 28, 2018.
Extended European Search Report and Search Opinion issued in European patent application 19173187.6.
Notice of allowance issued in U.S. Appl. No. 15/424,224 on Jul. 18, 2018.
Office action issued in European patent application 13806430 on Dec. 20, 2018.
Response filed in European patent application 13806430 on Apr. 29, 2019.
Office action issued in U.S. Appl. No. 14/409,117 on Jun. 28, 2018.
Response and RCE filed in U.S. Appl. No. 14/409,117 on Sep. 25, 2018.
Office action issued in U.S. Appl. No. 14/409,117 on Dec. 11, 2018.
Response filed in U.S. Appl. No. 14/409,117 on Feb. 25, 2019.
Notice of allowance issued in U.S. Appl. No. 14/409,117 on Jul. 10, 2019.
Response filed in Australian patent application 2016-235014 on Apr. 22, 2018.
Notice of allowance issued in U.S. Appl. No. 14/409,124 on Aug. 9, 2018.
Response filed in U.S. Appl. No. 15/364,527 on May 14, 2018.
Office action issued in Russian patent application 2014140183 on Feb. 10, 2017.
Office action from U.S. Appl. No. 15/498,983 issued Oct. 9, 2018.
Notice of allowance from U.S. Appl. No. 15/477,152 issued Oct. 6, 2017.
Response filed in application EP 19173187.6, Apr. 2020.
Intent to grant notification from application EP 18205670.5, dated Jan. 2020.
ICPI Workshop 2011, "Weed Washer," What is a Micron (Micron v/s Mesh), available at http:/www.fs.usda.gov/Internet/FSE_DOCUMENTS/stelprdb5366477.docx, accessed Aug. 2016.
Intent to grant notification from application EP 18192589.2, dated Nov. 25, 2019.
Notice of allowance from U.S. Appl. No. 15/894,301, issued Dec. 16, 2019.
Notice of allowance from U.S. Appl. No. 15/894,301, issued Feb. 27, 2020.

\* cited by examiner

PROCESSES FOR THE REMOVAL OF RUBBER FROM NON-*HEVEA* PLANTS

CROSS-REFERENCE TO RELATED APPLICATION

This application is a continuation of U.S. application Ser. No. 17/814,600 with a filing date of Jul. 25, 2022 and assigned U.S. Pat. No. 11,834,526, entitled "PROCESSES FOR THE REMOVAL OF RUBBER FROM NON-*HEVEA* PLANTS," which is a continuation of U.S. application Ser. No. 16/851,094 with a filing date of Apr. 17, 2020 and assigned U.S. Pat. No. 11,396,560, entitled "PROCESSES FOR THE REMOVAL OF RUBBER FROM NON-*HEVEA* PLANTS," which is a continuation of U.S. application Ser. No. 15/894,301 with a filing date of Feb. 12, 2018 and now issued as U.S. Pat. No. 10,626,194, entitled "PROCESSES FOR THE REMOVAL OF RUBBER FROM NON-*HEVEA* PLANTS," which is a continuation of U.S. application Ser. No. 15/477,152, with a filing date of Apr. 3, 2017 and now issued as U.S. Pat. No. 9,890,262, entitled "PROCESSES FOR THE REMOVAL OF RUBBER FROM NON-*HEVEA* PLANTS," which is a continuation of U.S. application Ser. No. 15/130,050, with a filing date of Apr. 15, 2016 and now issued as U.S. Pat. No. 9,611,334, entitled "PROCESSES FOR THE REMOVAL OF RUBBER FROM NON-*HEVEA* PLANTS," which is a continuation of U.S. application Ser. No. 14/383,379, with a filing date of Sep. 5, 2014 and now issued as U.S. Pat. No. 9,315,589, entitled "PROCESSES FOR THE REMOVAL OF RUBBER FROM NON-*HEVEA* PLANTS," which is a national stage of PCT Application Serial No. PCT/US2013/029451, filed Mar. 6, 2013, entitled "PROCESSES FOR THE REMOVAL OF RUBBER FROM NON-*HEVEA* PLANTS," which claims priority to and any other benefit of U.S. Provisional Patent Application Ser. No. 61/607,448, filed Mar. 6, 2012, and entitled "PROCESSES FOR THE REMOVAL OF RUBBER FROM NON-*HEVEA* PLANTS," the entire disclosure of which is incorporated by reference herein; U.S. Provisional Patent Application Ser. No. 61/607,460, filed Mar. 6, 2012, and entitled "PROCESSES FOR THE PURIFICATION OF GUAYULE-CONTAINING SOLUTIONS," the entire disclosure of which is incorporated by reference herein; U.S. Provisional Patent Application Ser. No. 61/607,469, filed Mar. 6, 2012, and entitled "PROCESSES FOR THE REMOVAL OF BAGASSE FROM A GUAYULE-RUBBER CONTAINING SOLUTION," the entire disclosure of which is incorporated by reference herein; U.S. Provisional Patent Application Ser. No. 61/607,475, filed Mar. 6, 2012, and entitled "PROCESSES FOR RECOVERING RUBBER FROM NON-*HEVEA* PLANTS USING BRIQUETTES," the entire disclosure of which is incorporated by reference herein; U.S. Provisional Patent Application Ser. No. 61/607,483, filed Mar. 6, 2012, and entitled "AGED BRIQUETTES CONTAINING PLANT MATTER FROM NON-*HEVEA* PLANTS AND PROCESSES RELATING THERETO," the entire disclosure of which is incorporated by reference herein; U.S. Provisional Patent Application Ser. No. 61/660,991, filed Jun. 18, 2012, and entitled "AGED BRIQUETTES CONTAINING PLANT MATTER FROM NON-*HEVEA* PLANTS AND PROCESSES RELATING THERETO," the entire disclosure of which is incorporated by reference herein; U.S. Provisional Patent Application Ser. No. 61/661,064, filed Jun. 18, 2012, and entitled "PROCESSES FOR THE REMOVAL OF RUBBER FROM NON-*HEVEA* PLANTS," the entire disclosure of which is incorporated by reference herein; U.S. Provisional Patent Application Ser. No. 61/661,052, and entitled "PROCESSES FOR THE REMOVAL OF RUBBER FROM NON-*HEVEA* PLANTS," the entire disclosure of which is incorporated by reference herein.

BACKGROUND

The *Hevea* plant or tree (also called *Hevea brasiliensis* or a rubber tree) is a well-known source of natural rubber (also called polyisoprene). Rubber sources such as *Hevea brasiliensis*, *Ficus* elastic (India rubber tree) and *Cryptostegia grandiflora* (Madagascar rubbervine) produce natural rubber in the form of a sap where the rubber is suspended in an aqueous solution that flows freely and can be recovered by tapping of the plant. Various non-*Hevea* plants are also known to contain natural rubber, but their rubber is stored within the individual cells of the plant (e.g., stems, roots or leaves) and cannot be accessed by tapping but can only be accessed by breaking down the cell walls by physical or other means. Thus, processes for the removal of rubber from non-*Hevea* plants are generally more complicated and entailed than processes for harvesting rubber from *Hevea* trees.

SUMMARY

Provided herein are organic solvent-based processes for the removal of rubber from non-*Hevea* plants. The processes are suitable for use in a laboratory or pilot plant and are scalable to a commercial-size plant that is designed to collect large quantities of rubber from non-*Hevea* plants.

In a first embodiment, a method of increasing the rubber recovery from non-*Hevea* plants is provided. The method comprises (A) utilizing briquettes comprising (i) compressed chopped plant matter having an average size of 1.5" or less, the plant matter comprising bagasse, rubber, resin, and residual water and (ii) no more than 5 weight % leaves from a non-*Hevea* plant, wherein the briquettes have a density that is 40-325% higher than the density of the non-compressed plant matter; (B) subjecting the briquettes to an organic solvent extraction process whereby the briquettes are mixed with at least one polar organic solvent and at least one non-polar organic solvent to form a slurry that contains 0.5-10 weight % water; and (C) processing the slurry to remove bagasse and resin and recover at least 95-99% by weight of the rubber contained within the briquettes.

In a second embodiment, a multi-step process for the removal of rubber from guayule plants is provided. In this process, initially, a slurry containing (i) plant matter from guayule shrubs (where the plant matter comprises bagasse, rubber and resin), (ii) at least one non-polar organic solvent and (iii) at least one polar organic solvent, where (ii) and (iii) are present in amounts at least sufficient to solubilize the resin and rubber from the plant matter is utilized. The slurry contains 10-50% by weight plant matter, 50-90% by weight of (ii) and (iii) combined, and 0.5-10 weight % water from the plant matter. A majority of the bagasse is removed from the slurry to produce a miscella. Optionally, additional polar organic solvent, non-polar organic solvent or a combination thereof (each of which may be the same or different than those utilized in the slurry of (a)) is added to the miscella to form a reduced viscosity miscella. The amount of any additional polar organic solvent that is added to the miscella is less than the amount that causes the rubber contained within the reduced viscosity miscella to coagulate. Next, 80-95 weight % of bagasse (based on the total weight of bagasse present in the reduced viscosity miscella or in the miscella that has had a majority of the bagasse removed) is removed from the miscella (either the reduced viscosity miscella resulting from addition of additional solvent(s) or the miscella that has had a majority of the bagasse removed) to form a purified miscella. The majority of bagasse that is removed in this second removal phase has a particle size of less than 105 microns. Optionally, the purified miscella is further treated to remove additional bagasse thereby producing a clarified rubber solution that contains 0.01-1% by weight bagasse (based on the total amount of bagasse present in the slurry); 90-99% of the additional bagasse that is removed has a particle size greater than 45 microns. The relative amount of polar organic solvent as compared to non-polar organic solvent within the clarified rubber solution or within the purified miscella is increased so as to cause the rubber contained within to coagulate. From the coagulated rubber, a solid purified rubber is produced. This solid purified rubber is such that when it contains 0.8 weight % volatile matter, it also contains 0.05-0.5 weight % dirt, 0.2-1.5 weight % ash, and 0.1-4 weight % resin. Multiple aspects of the process are conducted at a temperature or temperatures of 10-80° C. (i.e., different aspects of the process may be conducted at the same temperature or at different temperatures) and a pressure of 35 to 1000 kPa.

DETAILED DESCRIPTION

Provided herein are processes for the removal of rubber from non-*Hevea* plants. For ease of description, the processes are described as embodiments; the use of this terminology is for ease of description only and should not be interpreted as limiting upon the disclosed processes.

Definitions

The terminology as set forth herein is for description of the embodiments only and should not be construed as limiting the invention as a whole.

As used herein, the term non-*Hevea* plant is intended to encompass plants that contain natural rubber within the individual cells of the plant.

As used herein the term "bagasse" is used to refer to that portion of the ground or chopped plant matter from a non-*Hevea* plant that is insoluble and, hence, is suspended rather than dissolved by organic solvents. As used herein, bagasse should be understood to include dirt and ash, unless otherwise specified.

As used herein the term "plant matter" means material obtained from a non-*Hevea* plant. Unless otherwise specified, the plant matter may include roots, stems, bark, woody material, pith, leaves and dirt.

As used herein the term "woody material" means the vascular tissue and meristematic material obtained from a non-*Hevea* plant. Unless otherwise specified, woody material does not include bark.

As used herein the term "bark" refers to the tough outer covering present on the stems and roots of certain (particularly woody or shrub-like) non-*Hevea* plants and should be understood to include all tissues outside the vascular cambium. Not all non-*Hevea* plants will contain bark.

As used herein the term "resin" means the naturally occurring non-rubber chemical entities present in non-*Hevea* plant matter, including but not limited to resins (such as terpenes), fatty acids, proteins, and inorganic materials.

As used herein the term "dirt" (such as used in the connection with the solid purified rubber produced by the processes disclosed herein) means non-plant material that may be associated with non-*Hevea* plants, particularly upon harvesting, such as soil, sand, clay and small stones. Dirt content in solid purified rubber can be determined by completely re-dissolving the solid rubber and pouring the solution through a 45 micron sieve. The sieve is then rinsed with additional solvent and dried. The weight of the material retained on the sieve represents the "dirt" content of the solid purified rubber.

As used herein the term "ash" (such as used in the connection with the solid purified rubber produced by the processes disclosed herein) means the inorganic material (i.e., free of carbon) that remains after ashing the rubber at 550° C.±25° C.

As used herein, the term "majority" means more than 50% but less than 100%. In certain embodiments, the term means 51-60%, and in other embodiments 60-95%.

As used herein, the phrase "volatile matter" refers to non-rubber matter that may be contained within a sample of solid-purified rubber, but which will volatilize at 100+/−5° C. (or 160+/−5° C. if the rubber sample is suspected to contain volatile hydrocarbon oils). A standard test for determining the volatile matter that is contained within a rubber sample is ASTM D1278-91 (1997).

The Processes

In a first embodiment, a method of increasing the rubber recovery from non-*Hevea* plants is provided. The method comprises (A) utilizing briquettes comprising (i) compressed chopped plant matter having an average size of 1.5" or less (e.g., ⅛" to 1.5" or smaller, as discussed further below), comprising bagasse, rubber, resin, residual water and (ii) no more than 5 weight % leaves from a non-*Hevea* plant, wherein the briquettes have a density that is 40-325% higher than the density of the non-compressed plant matter; (B) subjecting the briquettes to an organic solvent extraction process whereby the briquettes are mixed with at least one polar organic solvent and at least one non-polar organic solvent to form a slurry that contains 0.5-10 weight % water; and (C) processing the slurry to remove bagasse and resin and recover at least 95-99% by weight of the rubber contained within the briquettes.

In a second embodiment, a multi-step process for the removal of rubber from guayule plants is provided. (As explained below, in alternative embodiments of this process, the plant matter that is utilized is from a non-*Hevea* plant other than a guayule plant.) Initially, a slurry containing (i) plant matter from guayule shrubs (where the plant matter comprises bagasse, rubber and resin), (ii) at least one non-polar organic solvent and (iii) at least one polar organic solvent is prepared. The slurry contains 10-50% by weight plant matter, 50-90% by weight of (ii) and (iii) combined, and 0.5-10 weight % water from the plant matter. A majority of the bagasse is removed from the slurry to produce a miscella. Optionally, additional polar organic solvent, non-polar organic solvent or a combination thereof (each of which may be the same or different than the solvents utilized in the slurry of (a)) is added to the miscella to form a reduced viscosity miscella. The amount of any additional polar organic solvent that is added to the miscella is less than the amount that causes the rubber contained within the reduced viscosity miscella to coagulate. Next, 80-95 weight % bagasse (based upon the total weight of bagasse present in the reduced viscosity miscella or in the miscella that has a majority of the bagasse removed) is removed from the reduced viscosity miscella or from the miscella which has had a majority of the bagasse removed to form a purified miscella. A majority of the bagasse that is removed (from the reduced viscosity miscella) has a particle size of less than 105 microns. Optionally, the purified miscella is further treated to remove additional bagasse thereby producing a clarified rubber solution that contains 0.01-1% by weight bagasse (based on the total amount of bagasse present in the slurry); 90-99% of the additional bagasse that is removed has a particle size greater than 45 microns. The relative amount of polar organic solvent as compared to non-polar organic solvent within the clarified rubber solution or within the purified miscella is increased so as to cause the rubber contained within to coagulate. From the coagulated rubber, a solid purified rubber is produced. This solid purified rubber is such that when it contains 0.8 weight % volatile matter, it also contains 0.05-0.5 weight % dirt, 0.2-1.5 weight % ash and 0.1-4 weight % resin. Multiple aspects of the process are conducted at a temperature or temperatures of 10-80° C. (i.e., different aspects of the process may be conducted at the same temperature or at different temperatures) and a pressure of 35 to 1000 kPa.

In certain particular embodiments of the second embodiment, the removal of bagasse in (b) comprises the use of a centrifuge. In such processes, initially, a slurry containing (i) chopped plant matter from guayule shrubs (where the plant matter contain bagasse, resin and rubber) and (ii) a co-solvent comprised of at least one non-polar organic solvent and at least one polar organic solvent, where (i) is present in an amount of 10-50% by weight (based on the total weight of the slurry), (ii) is present in an amount of 50-90% by weight (based on the total weight of the slurry) and the at least one polar organic solvent is present in an amount of 10-40% by weight (based on the total amount of solvent) is utilized. (As explained below, in alternative embodiments of this process, the plant matter that is utilized is from a non-*Hevea* plant other than a guayule plant.) The slurry is subjected to a centrifuging in order to remove 70-95% by weight bagasse (based on the total weight of bagasse present in the slurry) thereby producing a miscella. Optionally, additional polar organic solvent, non-polar organic solvent or a combination thereof (each of which may be the same or different than the organic solvents in the slurry) is added to the miscella to form a reduced viscosity miscella with a viscosity lower than 200 centipoise. The amount of any additional polar organic solvent that is added is less than the amount that causes the rubber contained with the reduced viscosity miscella to coagulate. Depending upon the type of centrifuge that is utilized when it is desirable to reduce the viscosity of the miscella, it may be possible to add some or all of the additional solvent directly to the machine(s) performing the extraction process so that the miscella exiting the extraction process is a reduced viscosity miscella with a viscosity lower than 200 centipoise. Next, additional bagasse, 80-95 weight % bagasse (based upon the total weight of bagasse present in the reduced viscosity miscella or in the miscella that has had at least 60% by weight bagasse removed) is removed from the reduced viscosity miscella or from the miscella to form a purified miscella. A majority of the bagasse that is removed in this second removal phase (i.e., from the reduced viscosity miscella or from the miscella that has had at least 60% by weight bagasse removed) has a particle size of less than 105 microns. Optionally, the purified miscella is further treated to remove additional bagasse thereby producing a clarified rubber solution that contains 0.01-1% by weight bagasse (based on the total weight of bagasse present in the slurry); 90-99% of the additional bagasse that is removed (from the purified miscella) has a particle size greater than 45 microns. The relative amount of polar organic solvent as compared to non-polar organic solvent within the clarified rubber solution or within the purified miscella is then increased so as to coagulate the rubber contained therein. The coagulated rubber is then isolated from the organic solvent to produce a solid rubber. When this solid rubber contains 0.8 weight % volatile matter, it also contains 0.05-0.5 weight % dirt, 0.2-1.5 weight % ash and 0.1-4 weight % resin. Multiple aspects of the process are conducted at a temperature or temperatures of 10-80° C. (i.e., different aspects of the process may be conducted at the same temperature or at different temperatures) and a pressure of 35-1000 kPa.

In certain particular embodiments of the second embodiment, the removal of bagasse in (b) comprises the use of an extraction decanter. Initially, a slurry containing (i) chopped plant matter from guayule shrubs (where the plant matter contain bagasse, resin and rubber) and (ii) a co-solvent comprised of at least one non-polar organic solvent and at least one polar organic solvent, where (i) is present in an amount of 10-50% by weight (based on the total weight of the slurry), (ii) is present in an amount of 50-90% by weight (based on the total weight of the slurry) and the at least one polar organic solvent is present in an amount of 10-40% by weight (based on the total amount of solvent) is utilized. (As explained below, in alternative embodiments of this process, the plant matter that is utilized is from a non-*Hevea* plant other than a guayule plant.) The slurry is subjected to an extraction decanting process (e.g., an extraction decanter) in order to remove 60-95% by weight bagasse (based on the total weight of bagasse present in the slurry) thereby producing a miscella. Optionally, additional polar organic solvent, non-polar organic solvent or a combination thereof (each of which may be the same or different than the organic solvents in the slurry) is added to the miscella to form a reduced viscosity miscella with a viscosity lower than 200 centipoise (e.g., 10-200 centipoise). The amount of any additional polar organic solvent that is added is less than the amount that causes the rubber contained with the reduced viscosity miscella to coagulate. Depending upon the type of extraction process that is utilized (e.g., an extraction decanter) when it is desirable to reduce the viscosity of the miscella, it may be possible to add some or all of the additional solvent directly to the machine(s) performing the extraction process so that the miscella exiting the extraction process is a reduced viscosity miscalls with a viscosity lower than 200 centipoise. Next, additional bagasse, 80-95 weight % bagasse (based upon the total weight of bagasse present in the reduced viscosity miscella or in the miscella that has had at least 60% by weight bagasse removed) is removed from the reduced viscosity miscella or from the miscella to form a purified miscella. A majority of the bagasse that is removed in this second removal phase (i.e., from the reduced viscosity miscella or from the miscella that has had at least 60% by weight bagasse removed) has a particle size of less than 105 microns. Optionally, the purified miscella is further treated to remove additional bagasse thereby producing a clarified rubber solution that contains 0.01-1% by weight bagasse (based on the total weight of bagasse present in the slurry); 90-99% of the additional bagasse that is removed (from the purified miscella) has a particle size greater than 45 microns. The relative amount of polar organic solvent as compared to non-polar organic solvent within the clarified rubber solution or within the purified miscella is then increased so as to coagulate the rubber contained therein. The coagulated rubber is then isolated from the organic solvent to produce a solid rubber. When this solid rubber contains 0.8 weight % volatile matter, it also contains 0.05-0.5 weight % dirt, 0.2-1.5 weight % ash and 0.1-4 weight % resin. Multiple aspects of the process are conducted at a temperature or temperatures of 10-80° C. (i.e., different aspects of the process may be conducted at the same temperature or at different temperatures) and a pressure of 35-1000 kPa.

In certain particular embodiments of the second embodiment, the removal of bagasse in (b) comprises the use of a pressing process. Initially, a slurry containing (i) chopped plant matter from guayule shrubs (where the plant matter contain bagasse, resin and rubber) and (ii) a co-solvent comprised of at least one non-polar organic solvent and at least one polar organic solvent, where (i) is present in an amount of 5-50% by weight (based on the total weight of the slurry) and (ii) is present in an amount of 50-95% by weight (based on the total weight of the slurry) and the at least one polar organic solvent is present in an amount of 10-35% by weight (based on the total amount of solvent) is utilized. (As explained below, in alternative embodiments of this process, the plant matter that is utilized is from a non-*Hevea* plant other than a guayule plant.) The slurry is subjected to a pressing process such as a "dewatering" process with a conveying screw inside a perforated cylinder (e.g., a screw press) in order to remove 51-60 weight % of the bagasse (based upon the total weight of the bagasse in the slurry), thereby producing a miscella. In certain embodiments of the third embodiment, it may be preferable to subject the bagasse to more than one round of pressing (e.g., through the screw press) with an additional amount of co-solvent being added to the bagasse press cake that is generated from the first pressing, thereby generating a second slurry that is subjected to another pressing with the two collections of liquor (the liquid containing the dissolved rubber and resin) being consolidated to form the miscella. Optionally, additional polar organic solvent, non-polar organic solvent or a combination thereof (each of which may be the same or different than the organic solvents in the slurry) is added to the miscella to form a reduced viscosity miscella with a viscosity lower than 200 centipoise (e.g., 10-200 centipoise). The amount of any additional polar organic solvent that is added is less than the amount that causes the rubber contained with the reduced viscosity miscella to coagulate. Next, 80-95 weight % bagasse (based upon the total weight of bagasse present in the reduced viscosity miscella or in the miscella that has had a 51-60% of the bagasse removed) is removed from the reduced viscosity miscella or from the miscella to form a purified miscella. A majority of the bagasse that is removed in this second removal phase (i.e., from the reduced viscosity miscella or the miscella that has had 51-60% of the bagasse removed) has a particle size of less than 105 microns. Optionally, the purified miscella is further treated to remove additional bagasse thereby producing a clarified rubber solution that contains 0.01-1% by weight bagasse (based on the total weight of bagasse present in the slurry); 90-99% of the additional bagasse that is removed (from the purified miscella) has a particle size greater than 45 microns. The relative amount of polar organic solvent as compared to non-polar organic solvent within the clarified rubber solution or within the purified miscella is then increased so as to coagulate the rubber contained therein. The coagulated rubber is then isolated from the organic solvent to produce a solid rubber. When this solid rubber contains 0.8 weight % volatile matter, it also contains 0.05-0.5 weight % dirt, 0.2-1.5 weight % ash and 0.1-4 weight % resin. Multiple aspects of the process are conducted at a temperature or temperatures of 10-80° C. (i.e., different aspects of the process may be conducted at the same temperature or at different temperatures) and a pressure of 35-1000 kPa.

Also provided herein, is a third embodiment wherein an organic solvent-based method is provided for purifying a solubilized guayule rubber solution that contains at least one non-polar solvent, at least one polar solvent, solubilized guayule rubber and up to 5-20 weight % bagasse and 0.5-10 weight % water (each based on the total weight of the solution). (As explained below, in alternative embodiments of this process, the plant matter that is utilized is from a non-*Hevea* plant other than a guayule plant.) The method (which is conducted at a pressure of 35-1000 kPa) comprises centrifuging the solution at a g force of 500-3,500 to remove at least 90-99% by weight of the bagasse (based upon the total weight of bagasse present in the solution) thereby producing a purified miscella. A majority of the bagasse that is removed (from the solution) has a particle size of less than 105 microns. The purified miscella is then filtered to remove additional bagasse and produce a clarified rubber solution that contains 0.01-1% by weight bagasse (based on the amount of bagasse in the solution); 90-99% of the additional bagasse that is removed (from the solution to form the clarified rubber solution) has a particle size greater than 45 microns.

Also provided herein, is a fourth embodiment comprising a process for removing bagasse from a guayule-rubber containing slurry. As part of the process, a slurry containing at least one non-polar organic solvent, at least one polar organic solvent, and plant matter from a guayule plant source is utilized. The plant matter comprises 1-15 weight % solubilized guayule rubber, 70-95 weight % bagasse and 3-20 weight % solubilized resin (As explained below, in alternative embodiments of this process, the plant matter that is utilized is from a non-*Hevea* plant other than a guayule plant.) Within the slurry, the total amount of non-polar and polar organic solvents is 50-90% by weight (based on the total weight of the slurry) and the amount of plant matter is 10-50% by weight (based on the total weight of the slurry). The slurry is moved into a decanter centrifuge that includes a discharge lock and the centrifuge is used to separate sufficient bagasse from the slurry to produce a miscella that contains (i) 60-95 weight % less bagasse than the slurry (based on the total amount of bagasse present in the slurry) and (ii) 1-10 weight % solubilized guayule rubber. The process is conducted at a pressure of 35-1000 kPa.

Types of Plant Matter/Sources of Bagasse

As previously mentioned, the processes according the first embodiment disclosed herein are utilized with plant matter from non-*Hevea* plants. It should also be understood that the second, third, and fourth embodiments, while described in detail with respect to use with guayule plant matter, could also be utilized in conjunction with certain non-*Hevea* plants other than guayule. All descriptions provided herein with respect to preparation of plant matter, slurries containing plant matter, and plant matter containing bagasse that is separated from the rubber and resin of the plant matter should be understood to encompass the use of guayule plant matter (i.e., from guayule shrubs), even if the particular explanation does not explicitly state that guayule plant matter is being addressed. Preferably, the processes disclosed herein are utilized with plant matter from guayule shrubs. Exemplary non-*Hevea* plants useful in certain embodiments of the first embodiment and in certain embodiments of the second, third and fourth processes disclosed herein, include, but are not limited to: *Parthenium argen-*

*tatum* (Guayule shrub), *Taraxacum kok-saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata*, et al (milkweeds), *Solidago altissima, Graminifolia rigida*, et al (goldenrods), *Cacalia atripilicifolia* (pale Indian plantain), *Pycnanthemum incanum* (mountain mint), *Teucreum canadense* (American germander) and *Campanula* Americana (tall bellflower). Other plants which produce rubber and rubber-like hydrocarbons are known, particularly among the Compositae, Euphorbiaceae, Campanulaceae, Labiatae, and Moracea families. When removing rubber from plant matter in certain embodiments of each of the first, second, third, and fourth embodiments of the processes disclosed herein, it is contemplated that one type of plant or a mixtures of more than one type of plant may be utilized. Preferably, according to each of the first, second, third and fourth embodiments disclosed herein, the plant matter utilized is from guayule shrubs.

In certain embodiments of the processes disclosed herein, the non-*Hevea* plant matter is obtained from at least one of: *Parthenium argentatum* (Guayule shrub), *Taraxacum kok-saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata*, et al (milkweeds), *Solidago altissima, Graminifolia rigida*, et al (goldenrods), *Cacalia atripilicifolia* (pale Indian plantain), *Pycnanthemum incanum* (mountain mint), *Teucreum canadense* (American germander) and *Campanula americana* (tall bellflower). In certain preferred embodiments according to the first, second, third, and fourth embodiments of the processes disclosed herein, the non-*Hevea* plant matter is obtained from guayule shrub (*Parthenium argentatum*).

Preparation of the Plant Matter

When the first, second, third, or fourth embodiments of the processes disclosed herein make use of plant matter from a guayule shrub, the plant matter that is utilized may take various forms as described further herein. The following discussion in this section should be understood to apply equally to the first, second, third and fourth embodiments of the processes disclosed herein. (Briquetting of the plant matter for use in the first embodiment of the processes disclosed herein and for use in certain embodiments of the second, third and fourth embodiments disclosed herein, is discussed in a separate section.) In certain embodiments of the processes disclosed herein, the plant matter comprises chopped guayule shrub including bark and woody tissue from the shrub but with no more than 5 weight %, preferably no more than 4 weight % or no more than 3 weight % or even more preferably no more than 1 weight % of the plant matter comprising leaves from the guayule shrub; in certain embodiments, the amount of plant matter comprising leaves is 1-5 weight % and in other embodiments, 0.5-5 weight % or 0.5-1 weight %. In certain of the foregoing embodiments, the guayule shrub used for the plant matter initially comprises both the above-ground portions and below-ground portions of the shrub (i.e., the stems (with bark, woody tissue and pith) and the roots). In other of the foregoing embodiments, the guayule shrub used for the plant matter initially comprises only the above-ground portions of the shrub (in other words, the roots are not included in the plant matter). The leaves of the guayule shrub may be removed using various methods such as field drying followed by shaking. Other methods for removing the leaves from the guayule shrub may occur to those of skill in the art and may be utilized as the particular method for removing leaves is not considered to be a significant limitation of the processes disclosed herein. In certain embodiments where the plant matter comprises guayule shrub, the shrubs are harvested by removing the entire plant (with roots intact) and allowing it to dry in the field to a water content of no more than 20 weight %, preferably no more than 15 weight % or even no more than 10 weight % water; in certain embodiments, the plant matter comprises 5-20 weight % water, preferably 5-15 weight % water.

In certain embodiments of the processes disclosed herein, the plant matter utilized in the slurry has been chopped into pieces with an average size of 1" or less. The chipping or chopping may take place in one or more than one step. For example, the non-*Hevea* plant that is utilized may be rough chopped at the location of harvesting (or elsewhere) into pieces averaging less than 2" in length. Alternatively, the non-*Hevea* plant that is utilized may be rough chopped into pieces of about 3" in length. Rough chopping may take place before or after the optional removal of leaves and soil (such as by shaking the plant or subjecting it to strong air currents), but is preferably after the removal of a large majority of leaves and soil from the harvested plant matter. Chipping or chopping into pieces with an average size of 1.5" or less or 1" or less may be achieved using various physical means. One exemplary way of obtaining chopped plant matter with an average size of 1.5" or less or 1" or less is to feed raw plant material (or optionally rough chopped plant matter) into a shredder, a granulator, a hammer mill or a roller mill.

A granulator is a well-known machine designed for chopping or grinding material into various sizes. Most granulators contain multiple knives (often steel knives) and one or more screens (sometimes interchangeable) with various diameter holes to determine the size of the final product. Various size granulators exist and may be useful in chopping the plant matter such as those containing openings of ⅜", ¼" and ⅛".

A hammer mill can generally be described as a steel drum containing a vertical or horizontal rotating shaft or drum on which hammers are mounted along with a surrounding screen-like material on the outer surface; the hammers "pound" the material that is passed through the mill. The hammers are generally flat metal bars often with some type of hardface treatment on the working ends. The hammers may be fixed or swinging. Various size hammer mills exist and may be useful in chopping the plant matter such as those containing screen openings of ⅜", ¼", 3/16" and ⅛". As the chopped material passes through the screen openings, the size of the screen openings directly determines the final particle size of the hammer milled material.

A roller mill/cracker mill can generally be described as a device with two or more rolls each containing longitudinal grooves which assist in further size reduction of material fed through the mill. Various size roller mills exist and may be useful in chopping the plant matter such as those containing openings of ¾", ½", ⅜", ¼" and ⅛". In certain embodiments according to the first, second and third embodiments of the processes disclosed herein, the plant matter is subjected to at least one of a shredder, a granulator, a hammer mill, a roller mill and a flaker mill to produce chopped plant matter having an average size of 1" or less (e.g., ⅛" to 1" or ⅛" to ½"). In other embodiments according to the first, second and third embodiments of the processes disclosed herein, the plant matter is subjected to at least two of a shredder, a granulator, a hammer mill, a roller mill and a flaker mill to produce chopped plant matter having an average size of 1" or less (e.g., ⅛" to 1" or ⅛" to ½ "). In yet other embodiments according to the first, second and third embodiments of the processes disclosed herein, the plant matter is subjected to shredding/chopping, hammer milling, roller milling and a flaker mill.

In certain embodiments of the processes disclosed herein, the plant matter utilized in the slurry (or the source of the bagasse within the slurry) has not only been chopped or shredded (such as by treatment in a shredder, a roller mill, hammer mill and/or granulator) but has also been subjected to a flaker mill/flaker and/or other mechanical treatment capable of rupturing the cell walls of the cells that contain the natural rubber prior to mixing with organic solvents to form a slurry. A flaker mill or flaker can generally be described as a device with two or more rolls each having a smooth surface, usually operated at different speeds, with a defined and adjustable clearance between rolls which primarily assist in providing further rupturing of plant cell walls. Such types of mechanical treatment tend to increase the amount of natural rubber that can ultimately be recovered from the plant matter. In certain preferred embodiments of the processes disclosed herein utilizing plant matter from guayule shrub, chopped plant matter is subjected to both roll milling and flake milling. In those embodiments where at least one of roll milling, or hammer milling, a shredder, a granulator and flake milling is used upon the chopped plant matter, the chopped plant matter is preferably treated with at least one antioxidant if the material will be stored prior to preparing the slurry (the amount of the antioxidant being in accordance with the antioxidant discussion herein).

In certain embodiments of the processes disclosed herein, it can be helpful to treat the chopped plant matter with an average size of 1.5" or less or 1" or less (such as exits a granulator) to remove undersize material. The amount of undersize material that is generated may vary depending upon various factors including the method used to chop or chip the plant material and the speed at which the chopping or grinding takes place. One exemplary way of removing undersize material is to pass the chopped plant matter over a mesh screen that is then vibrated to allow undersize material to fall through the mesh. Various types of mesh screen may be utilized, depending upon the size of material that is classified as "undersize." In certain embodiments, a 30 mesh, 25 mesh, 20 mesh, 18 mesh or 16 mesh screen is utilized. The mesh rating of the screen corresponds to the number of openings per square inch. Hence a 20 mesh screen will have 20 openings in one square inch. The sizes of the openings in the listed mesh screens are as follows: 30 mesh (0.0232" openings or 595 micron openings); 25 mesh (0.0280" openings or 707 micron openings); 20 mesh (0.0331" openings or 841 micron openings); 18 mesh (0.0394" openings or 1000 micron openings); and 16 mesh (0.0469" openings or 1190 micron openings). Another exemplary way to remove undersize material is by using an air separator which functions to blow away or out undersize (and hence lighter) particles. Preferably when undersize material is removed (such as by a mesh screen), at least 90% by weight, even more preferably at least 95% by weight of the undersize material is removed. In certain embodiments, the plant material that is used for the slurry has a size of 1/16" to 1.5", preferably 1/16 to 1", even more preferably 1/8" to 1/2"; in certain such embodiments the plant material has been subjected to a process such as granulation that utilizes a screen having opening of 1/16" 1/8", 1/4" or 1/2 " thereby producing material having a maximum size of no bigger than the openings.

In certain embodiments of the first, second, and fourth processes disclosed herein, the slurry that is utilized contains 10-50 weight % plant matter (based on the total weight of the slurry) with the remaining amount of the slurry comprising organic solvents. (Notably, as discussed previously, with respect to the third embodiment of the processes disclosed herein, the solution contains 5-20 weight % bagasse.) In addition to the 10-50 weight % plant matter, the slurry also contains 0.5-10 weight % of water, the water being contributed to the slurry by the plant matter and included within the 10-50 weight % allotment of plant matter within the slurry. In other words, the 10-50 weight % plant matter of the slurry encompasses the water contained within in the slurry. In certain embodiments according to the first, second and fourth embodiments of the processes described herein, the slurry that is utilized contains 25-50 weight % plant matter (based on the total weight of the slurry) with the remaining amount of the slurry comprising organic solvents. These limitations as to the amount of plant matter used within the slurry apply to those embodiments of the first, second and fourth embodiments of the processes described herein where the plant matter is from a non-*Hevea* plant and particularly to those where the plant matter is from a guayule shrub.

As previously discussed, according to the first, second and fourth embodiments of the processes described herein, the plant matter utilized in the slurry provides bagasse, rubber and resin. (Notably, in the third embodiment of the processes disclosed herein, the solubilized guayule rubber solution also contains bagasse, rubber and resin along with organic solvents.) The solubilized guayule rubber solution of the third embodiment has less bagasse (5-20%) as compared to certain of the other embodiments (10-50%) either because less plant matter has been added relative to the organic solvents or, more preferably, because some amount of bagasse has already been removed to create the solubilized guayule rubber solution.) The rubber and resin that are contained within the slurry are solubilized by the at least one non-polar organic solvent and at least one polar organic solvent, respectively. In certain embodiments according to the first, second and fourth embodiments of the processes described herein, the plant matter utilized in the slurry includes bark, woody material, rubber and resin. In certain embodiments according to the first, second, and fourth embodiments of the processes described herein, woody material comprises at least 80 weight %, at least 85 weight % or even at least 90 weight % of the plant matter and the remaining plant matter comprises bark and leaves; in certain such embodiments, the woody material comprises 80-100%, 80-95% or 90-100% or 90-99% of the plant matter. In order to achieve the foregoing make-up of plant matter it may be necessary to remove or limit the amount of bark and leaves that is utilized within the plant matter. In yet other embodiments according to the first, second and fourth embodiments of the processes described herein, bark comprises at least 50 weight %, at least 60 weight %, at least 70 weight % or even at least 80 weight % of the plant matter and the remaining plant matter comprises woody material and leaves; in certain such embodiments, the bark comprises 50-100%, 50-95% or 70-100% or 70-99% of the plant matter. These limitations as to the amount of plant matter used within the slurry apply to those embodiments of the first, second, and fourth embodiments of the processes described herein where the plant matter is from a non-*Hevea* plant and particularly to those where the plant matter is from a guayule shrub. In order to achieve the foregoing make-up of plant matter it will likely be necessary to remove or limit the amount of woody material and leaves that is utilized within the plant matter that goes into the slurry. Each portion of the plant matter (i.e., bark, woody material and leaves) will contain varying amounts of rubber, resin and water.

In certain embodiments, the slurry utilized in the first, second, and fourth embodiments of the processes described herein contains 0.5-10 weight % water. While the processes described herein are organic solvent based, some small residual amount of water (i.e., 0.5-10 weight %) may be present (primarily from residual water contained within the plant matter, although a small amount may be contributed by residual water within the organic solvents). In certain embodiments according to the first, second, and fourth embodiments of the processes described herein, the slurry contains 0.5-7 weight % water, 0.5-5 weight % water or even 0.5-2 weight % water. In certain embodiments according to the first, second, and fourth embodiments of the processes described herein, the slurry contains no more than 4 weight % water, no more than 3 weight % water or even no more than 2 weight % water. In preferred embodiments of the first, second and fourth embodiments of the processes disclosed herein, the slurry preferably contains no bleaching agent, defoaming agent or organic protein-denaturing compound. In preferred embodiment of the third embodiment of the processes disclosed herein, the solubilized guayule rubber solution contains no bleaching agent, defoaming agent or organic protein-denaturing compound.

Utilization of Briquetted Plant Matter

The following description of briquetted plant matter should be understood to be applicable to not only the first embodiment of the processes disclosed herein but also to certain embodiments of the second embodiment of the processes disclosed herein (i.e., when the second embodiment utilizes plant matter in briquetted form to form the slurry).

Preparation of the Plant Matter for Briquettes

In certain embodiments of the processes disclosed herein, the briquettes are made from plant matter that has been chopped or chopped into pieces with an average size of 1" or less. Generally, the chipping or chopping of the plant matter to a size of 1.5" or less or 1" or less may take place in one or more than one step. For example, the non-*Hevea* plant that is utilized may be rough chopped at the location of harvesting into pieces averaging less than 2" in length. Rough chopping may take place before or after the optional removal of leaves and soil (such as by shaking the plant or subjecting it to strong air currents), but is preferably after the removal of a large majority of leaves and soil from the harvested plant matter. Chipping or chopping into pieces with an average size of 1.5" or less or 1" or less may be achieved using various physical means. One exemplary way of obtaining chopped plant matter with an average size of 1.5" or less or 1" or less is to feed raw plant material (or optionally rough chopped plant matter) into a shredder, a granulator, a hammer mill or a roller mill. A granulator is a well-known machine designed for chopping or grinding material into various sizes. Most granulators contain multiple knives (often steel knives) and one or more screens (sometimes interchangeable) with various diameter holes to determine the size of the final product. Various size granulators exist and may be useful in chopping the plant matter such as those containing openings of ⅜", ¼" and ⅛". A hammer mill can generally be described as a steel drum containing a vertical or horizontal rotating shaft or drum on which hammers are mounted; the hammers "pound" the material that is passed through the mill. Various size hammer mills exist and may be useful in chopping the plant matter such as those containing openings of ⅜", ¼" and ⅛". A roller mill/cracker mill can generally be described as a device with two or more rolls each containing longitudinal grooves which assist in further size reduction of material fed through the mill. Various size roller mills exist and may be useful in chopping the plant matter such as those containing openings of ⅜", ¼" and ⅛". In certain embodiments according to the first and second embodiments of the processes disclosed herein, the plant matter is subjected to at least one of a granulator, a shredder, a hammer mill, a roller mill and a flaker mill to produce chopped plant matter having an average size of 1" or less". In other embodiments according to the first and second embodiments of the processes disclosed herein, the plant matter is subjected to at least two of a shredder, a granulator, a hammer mill, a roller mill and a flaker mill to produce chopped plant matter having an average size of 1" or less.

In certain embodiments of the processes disclosed herein, the plant matter utilized in the briquettes has not only been chopped or shredded (such as by treatment in a shredder, a roller mill, hammer mill and/or granulator) but has also been subjected to a flaker mill/flaker and/or other mechanical treatment capable of rupturing the cell walls of the cells that contain the natural rubber after briquetting but prior to being mixed into the slurry. A flaker mill or flaker can generally be described as a device with two or more rolls each having a smooth surface, usually operated at different speeds, with a defined and adjustable clearance between rolls which primarily assist in providing further rupturing of plant cell walls. Such types of mechanical treatment tend to increase the amount of natural rubber that can ultimately be recovered from the plant matter. In certain preferred embodiments of the first and second embodiments of the processes disclosed herein utilizing plant matter from guayule shrub, chopped plant matter is subjected to both roll milling and flake milling. In other embodiments, chipped plant matter from the guayule shrub is used for the briquettes, and the chopped plant matter is subjected to at least one of roll milling, a shredder, a granulator and hammer milling prior to compression into a briquette and flake milling after briquetting (during but before preparation of the slurry). In those embodiments where at least one of roll milling, or hammer milling, a shredder, a granulator and flake milling is used upon the chopped plant matter, the chopped plant matter is preferably treated with at least one antioxidant prior to being compressed into a briquette (the amount of the antioxidant being in accordance with the previous antioxidant discussion).

In certain embodiments according to the first and second embodiments of the processes disclosed herein, it can be helpful to treat the chopped plant matter with an average size of 1.5" or less or 1" or less (such as exits a granulator) to remove undersize material before briquetting. The amount of undersize material that is generated may vary depending upon various factors including the method used to chop or chip the plant material and the speed at which the chopping or grinding takes place. One exemplary way of removing undersize material is to pass the chopped plant matter over a mesh screen that is then vibrated to allow undersize material to fall through the mesh. Various types of mesh screen may be utilized, depending upon the size of material that is classified as "undersize." In certain embodiments, a 30 mesh, 25 mesh, 20 mesh, 18 mesh or 16 mesh screen is utilized. The mesh rating of the screen corresponds to the number of openings per square inch. Hence a 20 mesh screen will have 20 openings in one square inch. The sizes of the openings in the listed mesh screens are as follows: 30 mesh (0.0232" openings or 595 micron openings); 25 mesh (0.0280" openings or 707 micron openings); 20 mesh (0.0331" openings or 841 micron openings); 18 mesh (0.0394" openings or 1000 micron openings); and 16 mesh (0.0469" openings or 1190 micron openings). Another exemplary way to remove undersize material is by using an air separator which functions to blow away or out undersize (and hence lighter) particles. Preferably when undersize material is removed (such as by a mesh screen), at least 90% by weight, even more preferably at least 95% by weight of the undersize material is removed. In certain embodiments, the plant material that is formed into briquettes has a size of 1/16" to 1.5", preferably 1/16 to 1", even more preferably 1/8" to 1/2"; in certain such embodiments the plant material has been subjected to a process such as granulation that utilizes a screen having opening of 1/16" 1/8", 1/4" or 1/2" thereby producing material having a maximum size of no bigger than the openings.

In certain embodiments, the plant matter that is compressed into the briquettes has not only been chipped but has also been subjected to a roller mill/cracker mill, flaker mill/flaker, hammer mill and/or other mechanical treatment capable of rupturing the cell walls of the cells that contain the natural rubber. A roller mill/cracker mill can generally be described as a device with two or more rolls each containing longitudinal grooves which assist in further size reduction of material fed through the mill. A flaker mill or flaker can generally be described as a device with two or more rolls each having a smooth surface, usually operated at different speeds, with a defined and adjustable clearance between rolls which primarily assist in providing further rupturing of plant cell walls. A hammer mill can generally be described as a steel drum containing a vertical or horizontal rotating shaft or drum on which hammers are mounted; the hammers "pound" the material that is passed through the mill. Such types of mechanical treatment tend to increase the amount of natural rubber that can ultimately be recovered from the plant matter. In certain embodiments, chipped plant matter from the guayule shrub is used for the briquettes, and the chipped plant matter is subjected to at least one of roll milling, flake milling and hammer milling prior to compression into a briquette. In those embodiments where at least one of roll milling, flake milling or hammer milling is used upon the chipped plant matter, the chipped plant matter is preferably treated with at least one antioxidant prior to being compressed into a briquette (the amount of the antioxidant being in accordance with the antioxidant discussion herein).

The briquettes that are used in the embodiments described herein may contain a certain amount of water. In certain embodiments, the briquettes contain 2-20% by weight water (based upon the total weight of the briquette). In other embodiments the briquettes contain 5-15% by weight water. The water that is within the briquettes has as its primary source residual water from the plant matter. The amount of water present in the briquettes can be adjusted such as by drying the chipped plant matter prior to compacting it into briquettes. In certain embodiments of the first and second embodiments described herein, the chipped plant matter is dried to reduce its moisture content by at least 2 weight %, by at least 4 weight % or even by at least 6 weight % prior to compacting the plant matter into briquettes. Various methods of achieving drying of the chopped plant matter can be utilized, including, but not limited to, sun drying, forced air drying (with air that is dry and/or heated). In certain embodiments, the plant matter may be dried prior to chipping. Another potential source for the water that may be present in the briquettes is additives added to the plant matter after harvest. As discussed in more detail later, these additives can include antioxidants and/or binders that may optionally be applied via aqueous solutions of the active ingredients.

When the embodiments disclosed herein make use of briquettes made of plant matter from a guayule shrub, the plant matter that is utilized may take various forms as described further herein. In certain embodiments, the plant matter comprises chopped guayule shrub including bark and woody tissue from the shrub but with no more than 5 weight %, preferably no more than 4 weight % or no more than 3 weight % or even more preferably no more than 1 weight % of the plant matter comprising leaves from the guayule shrub. In certain of the foregoing embodiments, the guayule shrub used for the plant matter initially comprises both the above-ground portions and below-ground portions of the shrub (i.e., the stems (with bark, woody tissue and pith) and the roots). In other of the foregoing embodiments, the guayule shrub used for the plant matter initially comprises only the above-ground portions of the shrub (in other words, the roots are not included in the plant matter). The leaves of the guayule shrub may be removed using various methods such as field drying followed by shaking. Other methods for removing the leaves from the plant matter of the guayule shrub before incorporating that plant matter into briquettes may occur to those of skill in the art and may be utilized as the particular method for removing leaves is not considered to be a significant limitation of the processes disclosed herein.

In certain embodiments, the plant matter utilized in the briquettes contains bagasse, rubber and resin. In certain embodiments, the plant matter utilized in the briquettes includes bark, woody material, rubber and resin. In certain embodiments, woody material comprises at least 70 weight %, 80 weight %, at least 85 weight % or even at least 90 weight % of the briquette and the remaining amount of the briquette comprises bark and leaves. In order to achieve the foregoing make-up of plant matter within the briquette it may be necessary to remove or limit the amount of bark and leaves that is utilized within the plant matter and compacted into briquettes. In yet other embodiments, bark comprises at least 50 weight %, at least 60 weight %, at least 70 weight % or even at least 80 weight % of the briquettes and the remaining amount of the briquettes comprise woody material and leaves. In order to achieve the foregoing make-up of plant matter within the briquettes it will likely be necessary to remove or limit the amount of woody material and leaves that is utilized within the plant matte and compacted into briquettes. In certain embodiments, the briquettes comprise at least 80% by weight bark, less than 20% by weight woody material and less than 1 weight % leaves. In order to achieve the foregoing make-up of plant matter within the briquettes it will likely be necessary to remove or limit the amount of woody material and leaves that is utilized within the plant matter and compacted into briquettes. In yet other embodiments, the briquettes contain less than 5 weight % or less woody material, with the remaining amount of the briquettes comprising up to 95 weight % bark and preferably less than 2 weight % leaves, even more preferably less than 1 weight % leaves. Each portion of the plant matter (i.e., bark, woody material and leaves) used within the briquettes will contain varying amounts of bagasse, rubber, resin and water.

Briquetting

As previously discussed, certain embodiments disclosed herein make use of compressed plant matter in the form of briquettes. The term briquette is meant to encompass various forms or shapes, including, but not limited to, pellets, cubes, rectangular solids, spherical solids, egg-shaped solids, bricks and cakes. Various methods exist for compacting the plant matter into briquettes. One method of preparing briquettes from the plant matter is to utilize a commercial briquetting machine to prepare the briquettes. Various companies manufacture these machines and they are available in various sizes and specifications. Exemplary briquetting machines include those manufactured by K.R. Komarek, Inc. (Wood Dale, IL), including the roll-type briquetting machines model no. B 100R and BR200QC. Generally, a briquetting machine utilizes a roll-type system to compact material, with or without the addition of a binder to the material that is being compressed. Pressure can be applied by the machine in varying amounts depending upon the machine utilized, the properties of the chipped plant matter and the properties desired in the briquettes. In certain embodiments, briquettes of plant matter from a guayule shrub are made using a briquetting machine. In certain of the foregoing embodiments, a binder is applied to the chipped plant matter prior to its being compressed into briquettes. Other methods of preparing briquettes of chipped plant matter from non-*Hevea* plants may occur to those of skill in the art and may be utilized within the scope of the processes disclosed herein.

In certain embodiments, the briquettes are made from chipped plant matter that has been treated with one or more binders prior to compression into briquettes. Various types of binders may be utilized, including, but not limited to, organic-based binders (such as wood products, clay, starches and ash), chemical-based binders (such as -sulfonate, lime, and sodiumbentonite and liquids such as water. The amount of binder utilized with the chipped plant matter may vary depending upon the type of briquette being formed. In certain embodiments, the amount of binder utilized with the briquette 0.1-5 weight % (based on the total weight of the briquette).

In certain embodiments, the briquettes are made from chipped plant matter that has been treated with one or more antioxidants prior to compression into briquettes. Suitable compounds for use as the one or more antioxidants in certain embodiments according to the first and second embodiments disclosed herein are well known to those skilled in the art and include, but are not limited to, 2,6-di-t-butyl-4-methylphenol (also known as 2,6-di-t-butyl-p-cresol); N-(1,3-dimethylbutyl)-N'-phenyl-1,4-benzenediamine; octadecyl-3-(3,5-di-tert.butyl-4-hydroxyphenyl)-propionate (commercially available as Irganox® 1076); 4,6-bis (octylthiomethyl)-o-cresol (commercially available as Irganox® 1520), monohydric hindered phenols such as 6-t-butyl-2,4-xylenol, styrenated phenols, butylated octylphenols; bisphends, for example 4,4'-butylidenebis(6-t-butyl-m-cresol), polybutylated bisphenol A, hindered hydroquinones such as 2,4-di-t-amylhydroquinone; polyphenols, such as butylated p-cresol-dicyclopentadiene copolymer; phenolic sulfides such as 4,4'-thiobis(6-t-butyl-3-methyl-phenol), alkylated-arylated bisphenol phosphites such as tris(nonylphenyl) phosphite, triazinetriones such as alkylated hydroxycinnamate triester of tris(2-hydroxyethyl)-triazinetrione, tris (alkyhydroxybenzyl)-triazinetrione; pentaerythritol esters such as tetrakis(methylene-3,5-di-t-butyl-4-hydroxyhydrocinnamate)-methane; substituted diphenylamines such as octylated diphenylamines, p-(p-touenesulfonamido)-di-phenylamine, nonylated diphenylamine, diisobutylene-diphenylamine reaction products; dihydroquinolines such as 6-dodecyl-1,2-dihydro-2,2,4-trimethylquinoline; dihydroquinoline polymers such as 1,2-dihydro-2,2,4-trimethylquinoline polymer; mercaptobenz-imidazoles such as 2-mercaptobenzimidazole; metal dithiocarbamates such as nickel dibutyldithiocarbamate, nickel diisobutyldithiocarbamate, nickel dimethyldithiocarbamate; ketone/aldehyde-arylamine reaction products such as aniline-butyraldehyde condensation products, diarylamine-ketone-aldehyde reaction products; and substituted p-phenylenediamines such as di-b-naphthyl-p-phenylenephenylenediamine and N-phenyl-N'-cyclohexyl-p-phenylenediamine. The total amount of the antioxidant employed in those embodiments according to the first and second embodiments disclosed herein that utilize at least one antioxidant may be in the range of 0.2% to 2% by weight of the purified solid rubber ultimately produced by the process (based upon the weight of the purified solid rubber containing 0.8 weight % volatile matter).

In certain embodiments, the briquettes are capable of being stored for at least 90 days after compacting while still having the rubber contained within the briquettes retain a molecular weight of at least 800,000, preferably at least 1,000,000. In certain preferred embodiments, the briquettes are made of chipped plant matter from a guayule shrub and the briquettes are capable of being stored for at least 90 days after compacting while still having the rubber contained within the briquettes retain a molecular weight of at least 800,000, preferably at least 1,000,000. In other embodiments, the briquettes are capable of being stored for at least 7 months (210 days) after compacting while still having the rubber contained within the briquettes retain a molecular weight of at least 800,000, preferably at least 1,000,000. In certain preferred embodiments, the briquettes are made of chipped plant matter from a guayule shrub and the briquettes are capable of being stored for at least 7 months (210 days) after compacting while still having the rubber contained within the briquettes retain a molecular weight of at least 800,000, preferably at least 1,000,000.

Preparation of the Slurry

Depending upon how the initial slurry (containing plant matter from a non-*Hevea* plant, at least one polar organic solvent and at least one non-polar organic solvent) has been prepared or processed, in certain embodiments of the first, second, third, and fourth embodiments of the processes disclosed herein, the overall extraction of rubber from the non-*Hevea* plant matter may be enhanced by ensuring that the non-*Hevea* plant matter is not only thoroughly contacted with the solvents but also by agitating or mixing the combination of plant matter and solvents. Various methods of mixing and/or applying agitation to the combination of plant matter and solvents may be utilized, including, but not limited to mixing in an agitated tank, homogenizing, dispersing and wet-milling. In certain such embodiments, one or more tanks or reactors may be utilized to apply mixing and/or agitation to the slurry or to the combination of plant matter and solvents either prior to utilizing the slurry or at least prior removing the majority of the bagasse from the slurry to produce a miscella. As those skilled in the art will appreciate, the extent of mixing and/or agitation will vary depending upon factors such as the size and concentration of the slurry or combination of plant matter and solvents, the size and power of the equipment being utilized for the mixing and/or agitation. In certain embodiments of the processes disclosed herein, the plant matter and the organic solvents (i.e., the at least one polar organic solvent and the at least one non-polar organic solvent) are allowed to remain in contact for a certain period of time prior to removing the bagasse portion of the plant matter from the organic solvent portion that contains solubilized rubber and resin. In certain embodiments, this period of time is 0.3-3 hours and in other embodiments 0.5-1.5 hours. In other embodiments, a longer period of contact is allowed such as 1-8 hours or more.

Removal of Bagasse from the Slurry

The following descriptions of the removal of bagasse from the slurry should be understood to apply generally to the first, second and fourth embodiments of the processes disclosed herein which each of which specify removal of bagasse from a slurry to form a miscella. It should also be understood to be applicable to certain embodiments of the third embodiment of processes disclosed herein, wherein further steps are utilized such as to prepare the solubilized guayule rubber solution from a slurry. As discussed above, according to the processes disclosed herein, a majority of the bagasse is initially removed from the slurry to produce a miscella. (Weight percentages of bagasse referred to herein are based upon dry weights of bagasse (i.e., with any organic solvents and water having been removed). As discussed further below, the majority of the bagasse that is initially removed is in certain embodiments is 60-95 weight % of the bagasse contained within in the slurry, and in other embodiments 51-60 weight %, 60-80 weight %, 70-95 weight % or 75-95 weight %. The total amount of bagasse present in the slurry may be determined by taking a representative sample of the slurry—taking care to ensure there is no settling of the bagasse within the slurry prior to taking the sample—and extracting the insoluble materials by repeated rinsing and centrifuging. In other words, repeated rinsing and centrifuging of sediment followed by repeated centrifuging of each resulting supernatant to ensure complete removal of the insoluble bagasse materials. Three or more rounds of rinsing and centrifuging may be necessary. After condensing and drying of insoluble materials to remove organic solvents, the total weight of the insoluble materials can be determined. The amount of bagasse present in the sample can be calculated and by extension the total weight of bagasse present in the entire slurry can be calculated.) The miscella contains a certain amount of bagasse (i.e., the portion not removed from the slurry), solubilized rubber, solubilized resin, at least one polar organic solvent and at least one non-polar organic solvent. In certain embodiments of the processes disclosed herein, 60-95 weight % of the bagasse, 60-80 weight %, 70-95 weight % or 75-95 weight % of the bagasse is removed from the slurry to form the miscella. In certain preferred embodiments of the processes disclosed herein, at least 70 weight % or at least 75 weight % of the bagasse is removed from the slurry to form the miscella.

This removal of the bagasse from the slurry take may place by utilizing various equipment and/or processes and/or chemicals. The bagasse portion that is removed from the slurry is referred to herein as a first bagasse portion. In certain preferred embodiments of the processes disclosed herein, the removing of the bagasse from the slurry to produce a miscella is accomplished by using a centrifuge, optionally a decanter centrifuge. In other embodiments of the processes disclosed herein, the removing of the bagasse from the slurry to produce a miscella is accomplished using an extraction decanter or a screw press. In yet other embodiments of the processes disclosed herein, the removing of the bagasse from the slurry to produce a miscella is accomplished using a counter-current extractor. While the following particular descriptions of the bagasse from the slurry are explained with respect to the second embodiment of the processes disclosed herein, it should be understood that each type of equipment described can also be utilized to remove bagasse from the slurry in certain embodiments of the first embodiment of the processes disclosed herein. Furthermore, the detailed description of the operation of a decanter centrifuge should be considered to be applicable to certain embodiments of the fourth embodiment of the processes disclosed herein. In certain embodiments of the processes disclosed herein, a portion or all of the first bagasse portion is fed back into the slurry so as to allow for transfer of additional solubilized rubber or resin that is associated with the solvent-wet bagasse into the liquid portion of the slurry (i.e., the miscella). In other embodiments of the processes disclosed herein, none of the first bagasse portion is fed back into the slurry. In certain embodiments of the processes disclosed herein, at least a portion of the miscella (containing solvents, rubber, resin and bagasse) that is produced from the slurry is fed back into the slurry. In other embodiments of the processes disclosed herein, none of the miscella is fed back into the slurry.

In certain embodiments, when a decanter centrifuge is utilized to remove bagasse from the slurry, it is operated at a speed sufficient to generate a g force of 500 to 3,500, preferably 1,000 to 3,000 or 1,000 to 2,500. (As those skilled in the art will understand g force is a measure of the amount of acceleration applied to a sample and is a function of rotations per minute and rotation radius.) It is also within the scope of the processes described herein to utilize more than one centrifuge to remove the majority of the bagasse from the slurry. In certain embodiments of the processes described herein, the solids content of the miscella that is produced by removing bagasse from the slurry is 5-20 weight %, preferably 7-18 weight % (based upon the total weight of the miscella), with solids being considered bagasse, rubber and resin. In certain embodiments according to the processes described herein, the miscella contains 1-10 weight % rubber and 1-10 weight % resin; in other embodiments the miscella contains 3-7 weight % rubber and 3-9 weight % resin.

As previously discussed, in certain particular embodiments of the second embodiment of the processes disclosed herein, the slurry is subjected to a centrifuging process in order to remove 70-95 weight % bagasse (based on the total weight of bagasse in the slurry) to produce a miscella. The miscella contains bagasse, solubilized rubber, solubilized resin, at least one polar organic solvent and at least one non-polar organic solvent. In certain embodiments, the slurry is subjected to a centrifuging process in order to remove at least 75 weight % bagasse; in certain such embodiments, 75-95 weight % of the bagasse. In certain embodiments, the centrifuge is a decanter centrifuge, and in certain such embodiments it is operated at a speed sufficient to generate 500-3,500 g, preferably 1,000 to 3,000 g. It is also within the scope of the processes described herein to utilize more than one centrifuge to remove at least 70 weight % (e.g., 70-95 weight %) or at least 75 weight % (e.g., 75-95 weight %) bagasse from the slurry. In certain embodiments of the processes described herein, the solids content of the miscella that is produced by removing bagasse from the slurry is 5-20 weight %, preferably 7-18 weight % (based upon the total weight of the miscella), with solids being considered bagasse, resin and rubber. In certain embodiments of the processes disclosed herein, the miscella contains 1-10 weight % rubber and 1-10 weight % resin or; in other embodiments of the processes described herein, the miscella contains 3-7 weight % rubber and 3-9 weight % resin.

As previously discussed, in certain particular embodiments of the second embodiment of the processes disclosed herein the slurry is subjected to an extraction process in order to remove 60-95% by weight bagasse (based on the total weight of bagasse present in the slurry), thereby producing a miscella. The extraction process may involve the use of an extraction decanter. An extraction decanter can be a scroll-type centrifuge (often horizontal) with a cylindrical conical solid-wall bowl. A scroll that is adapted to the bowl wall is located within the bowl and rotates therein. The suspension or slurry to be extracted is fed into the machine (often via distributor slots in the scroll of the bowl). The slurry or suspension then enters the counter-current extraction zone of the bowl and flows to the conical end of the bowl via a separating disc against the flow of an extraction agent that is added (i.e., counter-current effect). The use of certain extraction decanters can allow for the addition of additional solvent during the extraction process and may be operated in a continuous or semi-continuous manner. Various types of extraction decanters exist, including those that employ counter-current extractions, scroll-type decanters and screen bowl type and solid bowl type. Preferably, the extraction decanter utilized is a counter-current extractor. As used herein, the phrase extraction decanter should be understood to include various types of extraction decanters including counter-current extractors, scroll-type decanters, screen bowl type and solid bowl typ. In certain embodiments according to the third embodiment of the processes disclosed herein, the slurry is subjected to an extraction process sufficient to remove at least 70 weight % bagasse. In certain embodiments according to the third embodiment, the extraction process consists of an extraction decanter. An extraction decanter can be operated at various settings, depending upon the size and parameters of the particular machine and the amount of bagasse that is to be removed. It is also within the scope of the third embodiment of the processes described herein to utilize more than one extraction decanter to remove at least 70 weight % or at least 75 weight % bagasse from the slurry. In certain embodiments according to the third embodiment of the processes described herein, the solids content of the miscella that exits the extraction decanter is 5-20 weight %, preferably 7-18 weight % (based upon the total weight of the miscella), with solids being considered bagasse, resin and rubber. In certain embodiments according to the third embodiment of the processes described herein, the miscella that exits the extraction decanter contains 1-10 weight % rubber and 1-10 weight % resin. In other embodiments according to the third embodiment of the processes described herein, the miscella contains 3-7 weight % rubber and 3-9 weight % resin. In certain embodiments according to the third embodiment of the processes disclosed herein where an extraction decanter is utilized and where it is desired to reduce the viscosity of the miscella, it will be possible to add part or all of the additional solvent (i.e., polar organic solvent, non-polar organic solvent or a combination thereof) directly to the extraction decanter so as to reduce the viscosity of the miscella exiting the extraction decanter to less than 300 centipoise or less than 200 centipoise. It is also specifically contemplated that the extraction process step (e.g., using an extraction decanter) with its removal of a portion of the bagasse contained within the slurry may be used in combination with the addition of additional solvent (i.e., polar organic solvent, non-polar organic solvent or a combination thereof) so as to provide a modified miscella that contains relatively less bagasse and, thus, has a solids content that is appropriate for processing via the next bagasse removal step (which, in certain embodiments, entails the use of a disc centrifuge). It should be appreciated that when the solids content of the material entering the disc centrifuge is relatively lower (e.g., in the range of 5-10 weight %), a relatively smaller disc centrifuge may be utilized.

As previously discussed, in certain particular embodiments of the second embodiment of the processes disclosed herein, the slurry is subjected to a pressing process in order to remove at least 60% by weight bagasse (based on the total weight of bagasse present in the slurry), thereby producing a miscella. The pressing process may involve the use of a screw press. A screw press is a type of machine that contains a screw within a chamber the length of which is surrounded by cylindrical screen-like material. The screw is caused to turn which causes the material within the chamber to press through the chamber and up against the screen. The shaft of the screw may be larger in diameter towards the far end of the shaft so that the increasing diameter pushes the solid material toward the screen whereby liquid is expelled through the screen. Solid material is generally pushed along by the screw and may be pressed against the screen but does not pass through. As the screw continues to turn, a collection of solid material forms at the far end of the chamber. This solid material is often referred to as a press cake. At the far end of the chamber a plug or door is located (the plug or door is often called a cone). The cone is usually held shut by air pressure and the higher the air pressure, the harder the screw must push against the press cake to open and the more liquid that is expelled from the press cake. Most screw presses can be operated in a continuous fashion. In certain embodiments of the processes disclosed herein, the slurry is subjected to a pressing process sufficient to remove at least 70 weight % bagasse. In certain embodiments, the pressing process is accomplished by a screw press. In embodiments where a screw press is utilized, it is can be operated at various conditions depending upon the size and operating parameters of the particular screw press utilized. Various commercially available screw presses exist, including, but not limited to, those sold by Vincent Corporation (Tampa, Florida).

In certain embodiments of the processes disclosed herein where a screw press is utilized it is operated at an rpm setting of 20-100 rpm, and at a back pressure of 5-15 psi (preferably 5-10 psi). It is also within the scope of the processes described herein to utilize more than one screw press or pass the bagasse through the screw press more than once (with addition of additional co-solvent to the bagasse press cake prior to any second pressing) to remove at least 70 weight % or at least 75 weight % bagasse from the slurry. In certain embodiments of the processes described herein, the solids content of the miscella that exits the press is 5-20 weight %, preferably 5-10 weight % (based upon the total weight of the miscella), with solids being considered bagasse, resin and rubber. In certain embodiments of the processes described herein, the miscella (liquor) that exits the press contains 1-10 weight % rubber and 1-10 weight % resin; in other embodiments, the miscella contains 3-7 weight % rubber and 3-9 weight % resin.

In certain embodiments of the processes disclosed herein, the removal bagasse from the slurry to produce a miscella is achieved by the use of a counter-current extractor. In certain embodiments, the bagasse removed by the counter-current extractor comprises 60-95% by weight of the bagasse that is contained within the slurry; in other embodiments 70-95% or even 75-95%. In certain embodiments utilizing the counter-current extractor, the bagasse and solvents mixture (i.e., the slurry) is mixed within a separate extractor for a period of time prior to use of the counter-current extractor, allowing for additional time for the solvent to contact the plant matter and solubilize the rubber and resins contained within the broken cells of the plant matter. In other embodiments, the bagasse and solvents mixture (i.e., the slurry) is not pre-mixed prior to being added to the counter-current extractor or is only pre-mixed just prior to being added to the counter-current extractor. A counter-current extractor works by the general principle of circulating or moving solids in one direction, while circulating or moving liquid (e.g., solvents) in the opposite direction, thereby increasing the amount of contact between solids and liquid. Various particular configurations of counter-current extractors are available and suitable for use in the processes disclosed herein.

In certain embodiments where a counter-current extractor is utilized, the plant matter that is mixed with the solvents to form the slurry is allowed to remain in contact with the solvents for a sufficient period of time to allow solubilization of the rubber and resin that is contained within the broken plant cells of the plant matter, prior to removing the majority of the bagasse from the counter-current extractor. In certain such embodiments, the plant matter is allowed to remain in contact with the solvents for 0.3-3 hours prior to removing the majority of the bagasse from the counter-current extractor; in other embodiments 0.5 hours-1.5 hours. It should be understood that the plant matter may be allowed to remain in contact with the solvents for longer period of time such as 1-8 hours or 3-8 hours prior to removing the majority of bagasse from the counter-current extractor. The contact periods of time referred to include both the (average) time that the plant matter is in contact with the solvents in the counter-current extractor, as well as any time that the plant matter is in contact with the solvents in the separate extractor, if such separate extractor is utilized.

In certain embodiments where a counter-current extractor is utilized, the counter-current extractor is configured such that it contains multiple levels or stages with each level or stage containing bagasse that has been subjected to the solvents for varying and increasing amounts of time. Within these stages, the bagasse is moved through the counter-current extractor by a conveyor belt, screw or another type of conveying apparatus. At what can be considered the final level or stage which is where the bagasse has been in contact with the solvent for the longest period of time, the bagasse is removed from the counter-current extractor (such as by the use of a screw, a conveyor belt or another type of conveying apparatus). In certain embodiments, the bagasse that is being removed from the counter-current extractor is subjected to rinsing with fresh solvent (i.e., the mixture of non-polar organic solvent and polar organic solvent) in order to remove at least part of the rubber that may be solubilized but is associated with the solvent-wet bagasse.

In certain embodiments where a counter-current extractor is utilized, the bagasse that is removed from the counter-current extractor contains both bagasse and solvent mixture in relative amounts of 40-80% by weight solvent; in other embodiments, the bagasse that is removed contains 40-60% by weight solvent or 40-50% by weight solvent. In certain embodiments where a counter-current extractor is utilized, the bagasse that is removed from the counter-current extractor is pressed or squeezed to remove additional solvent. This squeezing or pressing may be employed by one or more methods including, but not limited to, a screw press, tray drier, extrusion, devolatilization, etc.

Adding Additional Organic Solvents

The following discussion should be understood as generally applicable to the first and second embodiments of the processes disclosed herein. Additionally, in may be useful in certain embodiments of the third and fourth embodiments of the processes disclosed herein to utilize additional organic solvents, and, thus, the discussion may also be considered applicable to those embodiments. As previously discussed, in certain embodiments of the processes disclosed herein, additional polar organic solvent, non-polar organic solvent or a combination thereof (each of which may be the same or different than the solvents present in the slurry) is added to the miscella to form a reduced viscosity miscella. The reduced viscosity miscella contains bagasse, solubilized rubber and resin as well as organic solvents. In certain preferred embodiments, any additional organic solvents added are the same as those contained within the slurry in order to simplify the process. The amount of any additional polar organic solvent that is added is less than the amount that causes the rubber contained within the reduced viscosity miscella to coagulate as the rubber should remain solubilized within the reduced viscosity miscella. As those skilled in the art will appreciate, the particular amount of any additional solvent(s) added will depend upon the volume of the miscella and the relative amounts of polar and non-polar organic solvents contained within the miscella as well as the particular subsequent processing to be performed upon the miscella to remove additional bagasse. In certain embodiments of the processes disclosed herein, the amount of additional solvent(s) added is an amount sufficient to produce a reduced viscosity miscella with a viscosity of less than 300 centipoise (e.g., 10-300 centipoise) and in other embodiments less than 200 centipoise (e.g., 10-200 centipoise). In certain embodiments, the step of adding additional polar organic solvent, additional non-polar organic solvent or a combination thereof is performed within the previous bagasse removal step and the viscosity of the miscella is such that it does not require further reduction. The general purpose behind reducing the viscosity of the miscella is to make it easier to remove smaller bagasse (e.g., fine bagasse finer than 105 microns and fine bagasse larger than 45 microns) in the subsequent steps of the process. As those skilled in the art will understand, the amount to which the viscosity of the reduced viscosity miscella is reduced (and accordingly, the amount of any additional organic solvent(s) added) will to a large extent be dictated by the parameters of the remaining steps of the process, including particularly the speed and/or number of steps by which smaller bagasse are removed to ultimately produce the coagulated rubber and solid purified rubber therefrom.

In certain embodiments of the processes described herein, the solids content of the reduced viscosity miscella or of the miscella/liquid material entering the next bagasse removal process is 2-18 weight %, preferably 5-15 weight % (based upon the total weight of the reduced viscosity miscella or of the miscella/liquid material), with solids including bagasse, rubber and resin. In certain embodiments according to the first embodiment of the processes described herein, the reduced viscosity miscella (or the miscella) contains 0.5-7 weight % rubber and 0.5-8 weight % resin (based upon the total weight of the reduced viscosity miscella or the miscella).

As previously discussed, in certain embodiments of the processes disclosed herein, additional polar organic solvent, non-polar organic solvent or a combination thereof (each of which may be the same or different than the organic solvents present in the slurry) is added to the miscella to form a reduced viscosity miscella with a viscosity lower than 200 centipoise (e.g., 10-200 centipoise). In other embodiments, additional polar organic solvent, non-polar organic solvent or a combination thereof is added to the miscella to form a reduced viscosity miscella with a viscosity lower than 300 centipoise (e.g., 10-300 centipoise). One or more than one organic solvent may be added. One or more than one polar organic solvent may be added. One or more than one non-polar organic solvent may be added. The reduced viscosity miscella contains bagasse, solubilized rubber and resin as well as organic solvents. In certain preferred embodiments, additional polar organic solvent is added to the miscella to form the reduced viscosity miscella. In certain preferred embodiments, any additional polar organic solvent is added that is the same as the at least one polar organic solvent contained within the slurry in order to simplify the process. The amount of any additional polar organic solvent that is added is less than the amount that causes the rubber contained within the reduced viscosity miscella to coagulate as the rubber should remain solubilized within the reduced viscosity miscella. As those skilled in the art will appreciate, the particular amount of additional organic solvent(s) added will depend upon the volume of the miscella and the relative amounts of polar and non-polar organic solvents contained within the miscella. The general purpose behind reducing the viscosity of the miscella is to make it easier to remove smaller bagasse (e.g., fine bagasse finer than 105 microns and fine bagasse larger than 45 microns) in the subsequent steps of the process. As those skilled in the art will understand, the amount to which the viscosity of the reduced viscosity miscella is reduced (and accordingly, the amount of additional organic solvent(s) added) will to a large extent be dictated by the parameters of the remaining steps of the process, including particularly the speed and/or number of steps by which smaller bagasse are removed to ultimately produce the coagulated rubber and solid purified rubber therefrom. In certain embodiments according to the second embodiment of the processes described herein, the solids content of the reduced viscosity miscella or of the liquid material entering the next bagasse removal process is 2-18 weight %, preferably 5-15 weight % (based upon the total weight of the reduced viscosity miscella), with solids including bagasse, rubber and resin. In certain embodiments according to the second embodiment of the processes described herein, the reduced viscosity miscella contains 0.5-7 weight % rubber and 0.5-8 weight % resin (based upon the total weight of the reduced viscosity miscella).

Second Removal of Bagasse

As should be clear from the previous discussion of the processes disclosed herein, after the miscella is produced by removing a majority of the bagasse from the slurry, additional bagasse remains within the miscella, a portion of which must be removed in order to produce a commercially acceptable final rubber product. As previously discussed, in the first and third embodiments of the processes disclosed herein, 80-95 weight % bagasse (based on the total weight of bagasse present in the reduced viscosity miscella or the miscella from which a majority of bagasse has been removed) is removed from the reduced viscosity miscella or from the miscella to form a purified miscella. A majority of the bagasse that is removed to form the purified miscella has a particle size less than 105 microns. (In other words, at least 50% by weight of the bagasse that is removed has a particle size less than 105 microns and in certain embodiments at least 90% or 95% by weight of the bagasse that is removed has a particle size less than 105 microns. The particle size range of the bagasse that is removed can be determined by drying the bagasse to remove organic solvents and then subjecting the dried mass to particle size analysis such as by sieve analysis. Various methods for particle size analysis are well known to those skilled in the art.) The purified miscella contains solubilized rubber and resin as well as organic solvents. In certain embodiments of the processes disclosed herein, at least 85 weight % (e.g., 85-95 weight %) or at least 90 weight % (e.g., 90-95 weight %) bagasse is removed to form the to form a purified miscella. In certain preferred embodiments according to the first and third embodiments of the processes disclosed herein, the removing of additional bagasse to produce the further purified miscella is accomplished by using a centrifuge, optionally a disk centrifuge. In certain embodiments, when a disk centrifuge is utilized, it is operated at a speed sufficient to generate a g force of 4,000 to 12,000, preferably 7,000 to 10,000. It is also within the scope of certain embodiments of the first and third embodiments of the processes described herein to utilize more than one centrifuge or more than one treatment method to remove the additional bagasse to produce the purified miscella. In certain embodiments of the processes described herein, the solids content of the purified miscella is 2-16 weight %, preferably 3-12 weight % (based upon the total weight of the purified miscella), solids including rubber, resin and bagasse. In certain embodiments according to the processes described herein, the purified miscella contains 0.5-7 weight % rubber and 0.5-8 weight % resin (based upon the total weight of the purified miscella).

Further Purification of the Purified Miscella

As previously discussed, optionally certain embodiments of the processes disclosed herein, the purified miscella is treated to remove additional bagasse thereby producing a clarified rubber solution that contains 0.01-1% bagasse (based on the total weight of bagasse present in the slurry). In certain such embodiments, 0.01-0.5% bagasse or even 0.01-0.1% bagasse (based on the total weight of bagasse present in the slurry) remains in the clarified rubber solution. 90-99% (by weight) of the additional bagasse that is removed (from the purified miscella) has a particle size greater than 45 microns and in other embodiments, 95-99% by weight of the additional bagasse that is removed has a particle size greater than 45 microns. The clarified rubber solution contains solubilized rubber and solubilized resin (from the plant matter) as well as polar and non-polar organic solvent. In certain preferred embodiments, the removing of additional bagasse from the purified miscella is accomplished by filtering, optionally by the use of a screen-bar element type-filter containing openings of 45 microns or less, continuously scraped by a rotating blade. Screen-bar element type filters are characterized by a screen filter with opening of a specified size through which fluid is passed. Solids larger than the openings are caught by the screen filter and removed from the screen filter by scraping such as by a rotating blade. The solids can then fall to the bottom of the filter apparatus where they can be collected and/or discharged periodically. Other processes, including, but not limited to other filtering methods, may be used to remove additional bagasse from the purified miscella to produce a clarified rubber solution that contains 0.01-1% bagasse (based on the total weight of bagasse present in the slurry). It is also within the scope of the processes described herein to utilize more than one filter or more than one treatment method to remove the additional bagasse thereby producing a clarified rubber solution that contains 0.01-1% bagasse (based on the total weight of bagasse present in the slurry).

Organic Solvents

In any of the embodiments of the processes disclosed herein, the organic solvents contained within the slurry (or within the solubilized guayule rubber solution of the third embodiment) and any additional organic solvents (polar organic solvent, non-polar organic solvent, or a combination thereof) added to the miscella to form a reduced viscosity miscella or elsewhere in the process may be the same or different (i.e., overall one non-polar organic solvent may be utilized and overall one polar organic solvent may be utilized, or alternatively more than one of each maybe be utilized.). Preferably, all non-polar organic solvent utilized within the process are the same and all polar organic solvent utilized within the process are the same.

In any of the foregoing embodiments of the processes disclosed herein, the at least one polar organic solvent of the slurry (or within the solubilized guayule rubber solution of the third embodiment) and any additional polar organic solvent added to the miscella to form a reduced viscosity miscella or added elsewhere in the process may be selected from the group consisting of alcohols having 1 to 8 carbon atoms (e.g., ethanol, isopropanol, ethanol and the like); ethers and esters having from 2 to 8 carbon atoms; cyclic ethers having from 4 to 8 carbon atoms; and ketones having from 3 to 8 carbon atoms (e.g., acetone, methyl ethyl ketone and the like); and combinations thereof. In certain preferred embodiments of the processes disclosed herein, the at least one non-polar organic solvent and any additional non-polar organic solvent are each hexane or cyclohexane with the at least one polar organic solvent and any additional polar organic solvent optionally being acetone. Other polar organic solvents (individually or in combination) may be used in embodiments of the processes disclosed herein as long as the polar organic solvent preferentially solvates a portion of non-rubber extractables (e.g., resins) and acts (at a certain concentration) to coagulate natural rubber. In any of the embodiments of the processes disclosed herein, mixtures of two or more polar organic solvents may be utilized.

In any of the foregoing embodiments of the processes described herein, the at least one non-polar organic solvent that is contained within the slurry and any additional non-polar organic solvent added to the miscella to form a reduced viscosity miscella or elsewhere in the process may be selected from the group consisting of alkanes having from 4 to 9 carbon atoms (e.g., pentane, hexane, heptanes, nonane and the like); cycloalkanes and alkyl cycloalkanes having from 5 to 10 carbon atoms (e.g., cyclohexane, cyclopentane and the like); aromatics and alkyl substituted aromatics having from 6 to 12 carbon atoms (e.g., benzene, toluene, xylene and the like); and combinations thereof. In certain preferred embodiments according to the first, second and third embodiments of the processes disclosed herein, the at least one polar organic solvent of the slurry and any additional polar organic solvent are each acetone, and the at least one non-polar organic solvent of the slurry and any additional non-polar organic solvent are optionally hexane or cyclohexane. Other non-polar organic solvents (individually or in combination) may be used in embodiments of the processes disclosed herein as long as the non-polar organic solvent preferentially solvates natural rubber. In any of the embodiments of the processes disclosed herein, mixtures of two or more non-polar organic solvents may be utilized.

As previously discussed, in certain embodiments of the processes described herein, the relative amount of at least one non-polar organic solvent and at least one polar organic solvent contained within the slurry is 50-90% by weight and 10-50% by weight, respectively, based upon the total amount of organic solvent. In certain preferred embodiments, the amount of the at least one non-polar organic solvent is 60-85% by weight and the amount of the at least one polar organic solvent is 15-40% by weight. In certain embodiments of the processes disclosed herein, it is advantageous to control or adjust the viscosity of the combined organic solvent mixture (i.e., the at least one non-polar organic solvent and the at least one polar organic solvent) to 10-1000 centipoise, particularly for certain portions of the process such as the slurry portion where rubber and resin are being solubilized from the ruptured cells of the plant. In certain such embodiments, the viscosity of the combined organic solvent mixture is controlled or adjusted to 35-800 centipoise. Relatively higher viscosities within the foregoing ranges will be useful for a portion of the process where rubber and resin solubilization from the ruptured cells of the plant is occurring so as to maximize solubilization and minimize settling of bagasse particles. Conversely, a relatively lower viscosity within the foregoing ranges will be useful for a portion of the process where rubber and resin have already been solubilized, but the bagasse is being washed to ensure that solubilized rubber and resin are retained with the liquid/solvent instead of with the solvent-wet bagasse.

Miscellaneous

In various embodiments according to the processes disclosed herein, one or more antioxidants may optionally be utilized along with the plant matter, the slurry or elsewhere in the process of removing rubber from the plant matter. In preferred embodiments of the processes disclosed herein, one or more antioxidant are added to the clarified rubber solution before the relative amount of polar organic solvent as compared to non-polar organic solvent is increased. However, in other embodiments of the processes disclosed herein, one or more antioxidants may be added at one or more other points during the process. Preferably, when one or more antioxidants are added, they are added after removal of the at least 80%, at least 85% or at least 90% bagasse from the reduced viscosity miscella. Alternatively, in certain embodiments of the processes disclosed herein, one or more antioxidants may be added to the plant matter prior to its incorporation into the slurry. Suitable compounds for use as the one or more antioxidants in the processes disclosed herein include, but are not limited to, 2,6-di-t-butyl-4-methylphenol (also known as 2,6-di-t-butyl-p-cresol); N-(1,3-dimethylbutyl)-N'-phenyl-1,4-benzenediamine; octadecyl-3-(3,5-di-tert.butyl-4-hydroxyphenyl)-propionate (commercially available as Irganox® 1076); 4,6-bis (octylthiomethyl)-o-cresol (commercially available as Irganox® 1520), monohydric hindered phenols such as 6-t-butyl-2,4-xylenol, styrenated phenols, butylated octylphenols; bisphenols, for example 4,4'-butylidenebis(6-t-butyl-m-cresol), polybutylated bisphenol A, hindered hydroquinones such as 2,4-di-t-amylhydroquinone; polyphenols, such as butylated p-cresol-dicyclopentadiene copolymer; phenolic sulfides such as 4,4'-thiobis(6-t-butyl-3-methyl-phenol), alkylated-arylated bisphenol phosphites such as tris(nonylphenyl) phosphite, triazinetriones such as alkylated hydroxycinnamate triester of tris(2-hydroxyethyl)-triazinetrione, tris (alkyhydroxybenzyl)-triazinetrione; pentaerythritol esters such as tetrakis(methylene-3,5-di-t-butyl-4-hydroxyhydrocinnamate)-methane; substituted diphenylamines such as octylated diphenylamines, p-(p-touenesulfonamido)-di-phenylamine, nonylated diphenylamine, diisobutylene-diphenylamine reaction products; dihydroquinolines such as 6-dodecyl-1,2-dihydro-2,2,4-trimethylquinoline; dihydroquinoline polymers such as 1,2-dihydro-2,2,4-trimethylquinoline polymer; mercaptobenz-imidazoles such as 2-mercaptobenzimidazole; metal dithiocarbamates such as nickel dibutyldithiocarbamate, nickel diisobutyldithiocarbamate, nickel dimethyldithiocarbamate; ketone/aldehyde-arylamine reaction products such as aniline-butyraldehyde condensation products, diarylamine-ketone-aldehyde reaction products; and substituted p-phenylenediamines such as di-b-naphthyl-p-phenylenephenylenediamine and N-phenyl-N'-cyclohexyl-p-phenylenediamine. The total amount of the antioxidant employed in those embodiments of the processes disclosed that utilize at least one antioxidant herein may be in the range of 0.2% to 2% by weight of the purified solid rubber ultimately produced by the process (based upon the weight of the purified solid rubber containing less than 0.5 weight % solvent).

As previously discussed, the relative amount of polar organic solvent as compared to non-polar organic solvent within the clarified rubber solution is increased so as to coagulate the rubber that is solubilized within the clarified rubber solution. In certain embodiments, the amount of polar organic solvent is increased by adding additional polar organic solvent. In other embodiments, the relative amount of polar organic solvent is increased by removing non-polar organic solvent. The relative amount of polar organic solvent is increased to an extent that causes the rubber contained within the clarified rubber solution to begin to coagulate. The particular amount of additional polar organic solvent that is added and/or the particular amount of non-polar organic solvent that is removed will depend upon the volume of the miscella and the relative amounts of polar and non-polar organic solvents contained within the miscella and upon the amount of rubber coagulation desired. Higher molecular weight rubber (which is generally more desirable in terms of a final product) will coagulate first. In certain embodiments according to the first, second and third embodiments, coagulation is controlled so that higher molecular weight rubber (preferably rubber with a molecular weight of at least 800,000 (e.g., 800,000-1,5,00,000), even more preferably at least 1,000,000 (e.g., 1,000,000-1,500,000)) coagulates and lower molecular weight rubber remains in solution. The molecular weights of rubber that are referred to herein are determined by GPC, utilizing a polystyrene standard.

In certain embodiments of the processes disclosed herein, it may be helpful to allow for some amount of settling time so that the fraction containing higher molecular weight rubber can separate from the lighter fraction containing lower molecular weight rubber and also resin. In certain embodiments of the processes disclosed herein, a fractionator (optionally cone-shaped) may be utilized to assist in the separation whereby the heavier, higher molecular weight rubber fraction settles at the bottom of the fractionators and can be removed (such as by pumping) from the bottom. In certain embodiments of the processes disclosed herein, the removal of the higher molecular weight rubber fraction is continuous so as to maintain a constant or relatively constant phase interface within the fractionator. The upper phase (containing lower molecular weight rubber and resin) can be separated and may be recycled or re-used in various ways. In certain embodiments, the relative amount of polar organic solvent as compared to non-polar organic solvent can be increased by both adding additional polar organic solvent and removing non-polar organic solvent. In certain embodiments, one or more than one additional polar organic solvent can be added to the clarified rubber solution in a total amount so as to coagulate the rubber solubilized therein. In preferred embodiments, when additional polar organic solvent is added, it is the same polar organic solvent as is contained within the slurry. In other embodiments according to the first, second and third embodiments, when additional polar organic solvent is added, it may be a different polar organic solvent than is contained within the slurry.

As previously discussed, according to the processes disclosed herein, solid purified rubber can be produced from the coagulated rubber that coagulates in the clarified rubber solution. Various processes can be utilized for isolating the solid purified rubber. These processes generally comprise removal of solvent (primarily non-polar organic solvent but also some polar organic solvent) associated with the coagulated rubber. Residual solvent can be removed from the coagulated rubber by evaporating the solvent such as with the application of heat and/or vacuum. In certain embodiments of the processes disclosed herein, the residual solvent is removed in one or multiple phases (two, three, four, five or more) that include the use of both heat and vacuum. In certain embodiments, heat that is applied preferably raises the temperature of the coagulated rubber to above the boiling point of the residual organic solvents associated with the coagulated rubber. In certain embodiments, this temperature is 40° C. to 100° C. in order to facilitate the removal of solvent. In certain embodiments, the pressure is reduced to 3-30 inches Hg (10-100 kPa) in order to facilitate the removal of solvent. Solvent that is removed can be condensed and recovered for further use. In preferred embodiments, the solid purified rubber that is produced has a molecular weight of at least 800,000 (e.g., 800,000-1,500,000), even more preferably at least 1,000,000 (e.g., 800,000-1,500,000), molecular weight being based upon a polystyrene standard. The amount of solvent that is removed from the coagulated rubber will vary according to desired use and shipment method. In certain embodiments, solid purified rubber can be collected into bales. In preferred embodiments, no more than 2 weight %, preferably no more than 1 weight % and even more preferably no more than 0.8 weight % of volatile matter (based upon the total weight of the solid purified rubber) remains within the solid purified rubber after it has been subjected to one or more solvent removal steps. As previously discussed, according to certain embodiments of the processes described herein, when the solid purified rubber contains 0.8 weight % volatile matter, it will also contain 0.05-0.5 weight % dirt, 0.2-1.5 weight % ash and 0.1-4 weight % resin. (It should be understood that the solid purified rubber produced according to the processes disclosed herein may contain relatively more or less organic solvent, and that the 0.8 weight % volatile matter is provided as an exemplary content for purposes of determining whether sufficient removal of dirt, ash and resin has been achieved. In certain preferred embodiments, the solid purified rubber contains 0.8 weight % or less volatile matter.

In certain embodiments of the processes described herein, the amount of rubber that is removed from the slurry represents at least 95 weight % (e.g., 95-99 weight % or 95-98 weight %) of the rubber that is contained within the plant matter-containing slurry. Preferably, in such embodiments, the plant matter is from guayule shrubs. In certain more preferred embodiments of the processes described herein, the amount of rubber that is removed from the slurry represents at least 96 weight % (e.g., 96-99 weight % or 96-99 weight %) of the rubber that is contained within the plant matter-containing slurry. In certain embodiments, the plant matter is from guayule shrubs. In preferred embodiments of the processes described herein, the amount of rubber that is removed from the slurry represents at least 98 weight % of the rubber that is contained within the plant matter-containing slurry. Preferably, in such embodiments, the plant matter is from guayule shrubs. Total rubber present in the plant matter-containing slurry can be determined following a similar method as to that used to determine total bagasse present in the slurry, as discussed above, except focusing upon the supernatants obtained from repeated centrifuging and rinsing. After all bagasse has been removed from the slurry sample (using the repeated centrifuging and rinsing procedure described previously), the supernatant portions are collected together and the rubber within is coagulated by adding additional polar solvent (the resin will remain solubilized). Polar solvent should be added beyond the point at which coagulation begins to ensure coagulation of lower molecular weight rubber as well as higher molecular weight rubber. The coagulated rubber can then be filtered away from the solvents, rinsed with several additional pure polar solvent fractions (the rinse being added to the resin-containing solvent portion). After drying (to remove any remaining solvent), the rubber is weighed and the total amount of rubber in the original plant matter-containing slurry can be calculated. Total resin present in the plant matter-containing slurry can be determined by drying the solvent left behind after the rubber coagulates (adding in all additional polar solvent rinses used to rinse the coagulated rubber).

Temperature

As previously discussed, multiple aspects of the processes herein are conducted at a temperature or temperatures of 10-80° C. and different aspects of the process may be conducted at the same temperature or at different temperatures) and a pressure of 35-1000 kPa. In certain embodiments according to the processes disclosed herein, multiple aspects of the process are conducted at a temperature or temperatures of 10-50° C. (preferably those aspects of the process denoted as (a)-(e) in various embodiments herein and/or meeting the description of being prior to the stage where organic solvent is removed from coagulated rubber). As those skilled in the art will understand, the particular temperature or temperatures at which the individual aspects of the processes are conducted may vary depending upon the identity of the at least polar organic solvent and at least one non-polar organic solvent utilized. However, it is intended that those aspects of the processes disclosed herein that are directed to removing bagasse from the slurry to produce a miscella; adding additional polar organic solvent to produce a reduced viscosity miscella; removing 80-95 weight % bagasse from the reduced viscosity miscella (or the miscella) to form a purified miscella; and optionally treating the purified miscella to remove additional bagasse thereby producing a clarified rubber solution containing 0.01-1% by weight bagasse will be operated at a temperature or temperatures below the boiling point of the mixture of at least one polar organic solvent and at least one non-polar organic solvent utilized. Subsequent or later aspects of the processes (i.e., increasing the relative amount of polar organic solvent as compared to non-polar organic solvent within the clarified rubber solution so as to coagulate the rubber and producing solid purified rubber from the coagulated rubber) are preferably conducted at a temperature or temperatures above the boiling point of the at least one polar organic solvent and/or above the boiling point of the mixture of the at least one polar organic solvent and at least one non-polar organic solvent.

Multiple steps within each of the first, second, third and fourth embodiments of the processes described herein are preferably conducted on a continuous basis. In certain embodiments of the first and second embodiments of the processes described herein, (a)-(g) are conducted on a continuous basis.

EXAMPLES

The following examples are for purposes of illustration only and are not intended to limit the scope of the claims which are appended hereto.

Unless otherwise defined, all technical and scientific terms used herein have the same meaning as commonly understood by one of ordinary skill in the art to which the technology of this application belongs. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative embodiments, and illustrative examples shown and described. Accordingly, departures may be made from such details without departing from the spirit or scope of the applicant's general inventive concept.

Example 1

A sample was prepared in order to simulate the removal of rubber from a non-*Hevea* rubber source. A champion bottle was used to prepare a sample that was 500 mL in volume and consisted of 12.4% (w/w) insoluble fines (the insoluble fines were bagasse and dirt/soil from harvesting of guayule shrub pellets), 4.8% (w/w) soluble rubber (obtained from coagulation of a natural rubber latex sourced from guayule shrubs) and 1.6% (w/w) mixed soluble resin plus degraded rubber. The mixed soluble resin plus degraded rubber and the insoluble fines were obtained from guayule shrub pellets using a co-solvent mix of 80 weight % hexane and 20 weight % acetone. The pellets had been prepared about 1.5 years earlier from chopped guayule shrub and stored. Upon use the pellets contained negligible, if any, moisture. The insoluble fines, soluble rubber and mixed soluble resin plus degraded rubber were dissolved using a co-solvent of acetone and hexane (the co-solvent contained 80 weight % hexane and 20 weight % acetone). The sample was shaken by hand and then quickly poured into 15 mL centrifuge tubes (shaking by hand between pours).

In order to simulate the step of removing bagasse, spin tests were conducted by placing the 15 mL centrifuge tubes into a Flottweg bottle centrifuge using settings of 1000×g (Sample 1-A) and 3000×g. (Sample 1-B) for the times indicated below in Table 1. A third treatment was conducted by first using a setting of 1000×g for 5 minutes and then subjecting the centrate from that test to a second spin treatment at 3000×g (Sample 1-C). Upon completion of the spinning, test samples were removed and analyzed to determine the amount of compacting of the solids and the % volume of sedimented material (results appear in Table 1). Thereafter, the centrate was decanted from the solids. Decanted centrate was analyzed after desolventization (to remove all or substantially all of the solvent and leave behind both soluble and insoluble solids). The percentage by weight of insoluble solids remaining could then be calculated and compared to the target of no more than 6% insoluble solids (results appear in Table 2). Thereafter, the solids from the bottom of the tube were analyzed to determine the relative amounts of soluble and insoluble solids contained therein (results appear in Table 2).

TABLE 1

| | Centrifuge setting | Time (minutes) | Sediment volume (%) | Packing |
|---|---|---|---|---|
| Sample 1-A | 1000 × g | 1 | 30 | medium compact |
| | | 2 | 30 | medium compact |
| | | 5 | 30 | medium compact |

TABLE 1-continued

| | Centrifuge setting | Time (minutes) | Sediment volume (%) | Packing |
|---|---|---|---|---|
| Sample 1-B | 3000 × g | 1 | 30 | medium compact |
| | | 2 | 30 | medium compact |
| | | 5 | 30 | medium compact |

TABLE 2

Dry substance analysis

| Stage of testing | % dissolved solids |
|---|---|
| Feed sample (before centrifuging) | 23.8 |
| Feed sample (before centrifuging) | 22.5 |
| Centrate from 1000 × g, 5 minutes | 11.6 (7.0% soluble and 4.6% insoluble) |
| Centrate from 3000 × g, 5 minutes | 10.5 (7.1% soluble and 3.4% insoluble) |

Example 2

In order to simulate the removal of rubber from a non-*Hevea* rubber source, several batches of rubber solution with different % fines were prepared as the feed material (the solutions were prepared from guayule shrub pellets and co-solvent of 80/20 hexane/acetone that were subjected to different treatments including screw press treatment). Sets of experiments were conducted with differing flow rates at 7000×g (low setting) and 12000×g (high setting) G-force. Centrate samples were collected from each set of experiments after centrifuging using a Westfalia Model CTC1 disc centrifuge. This disc centrifuge contains a bowl with 1 liter volume capacity and can hold up to 0.5 liters in solids. After centrifuging, solid rubber samples were coagulated from the centrate by adding additional acetone to the centrate until the rubber coagulated (generally rubber coagulation will occur at about 1.2:1 hexane/acetone weight ratio). The solvent was decanted from the coagulated rubber and the wet rubber that remained was desolventized by drying in a vacuum oven at 70° C. Ash and dirt concentrations within the dried rubber samples were analyzed using ASTM D1278-91. Results are summarized in Table 3.

TABLE 3

| % Fines in Feed | | | | Flow | | | |
|---|---|---|---|---|---|---|---|
| w/w % | v/v % | Sample ID | G Force | Rate (L/min) | % Ash in Rubber | % Dirt in Rubber | Highest TSR Met |
| 0.06 | 0.15 | 2688-131 | 7000 | 0.25 | 0.22 | 0.07 | TSR-10 |
| | | | 12000 | 0.25 | 0.17 | 0.15 | TSR-20 |
| 0.42 | 1 | 2688-139 | 7000 | 0.5 | 0.53 | 0.16 | TSR-20 |
| | | | | 1 | 0.67 | 0.16 | TSR-20 |
| | | | | 1.5 | 0.69 | 0.09 | TSR-20 |
| | | | 12000 | 0.5 | 0.34 | 0.09 | TSR-10 |
| | | | | 1 | 0.31 | 0.05 | TSR-CV |
| | | | | 1.5 | 0.47 | 0.16 | TSR-20 |
| 0.58 | 1.4 | 2688-129 | 7000 | 1.25 | 0.73 | — | |
| | | | 12000 | 0.5 | 0.15 | — | |
| 1.6 | 3.8 | 2688-137 | 7000 | 0.5 | 0.44 | — | |
| | | | | 1 | 0.54 | 0.14 | TSR-20 |
| | | | | 1.5 | 0.61 | 0.06 | TSR-10 |
| | | | 12000 | 0.5 | 0.24 | 0.04 | TSR-CV |
| | | | | 1 | 0.56 | 0.07 | TSR-10 |
| | | | | 1.5 | 0.60 | 0.13 | TSR-20 |

TABLE 3-continued

| % Fines in Feed | | | | Flow | | | |
|---|---|---|---|---|---|---|---|
| w/w % | v/v % | Sample ID | G Force | Rate (L/min) | % Ash in Rubber | % Dirt in Rubber | Highest TSR Met |
| 5.31 | 12.6 | 2688-141 | 7000 | 0.5 | 0.61 | 0.16 | TSR-20 |
| | | | | 1 | 0.86 | 0.22 | TSR-50 |
| | | | | 1.5 | 1.34 | 0.26 | TSR-50 |
| | | | 12000 | 0.5 | 0.27 | 0.12 | TSR-50 |
| | | | | 1 | 0.45 | 0.07 | TSR-10 |
| | | | | 1.5 | 0.53 | 0.17 | TSR-20 |
| 6.83 | 16.2 | 2688-143 | 7000 | 0.5 | 1.17 | 0.32 | TSR-50 |
| | | | | 1 | 1.64 | 0.38 | |
| | | | | 1.5 | 1.81 | — | |
| | | | 12000 | 0.5 | 0.72 | 0.08 | TSR-10 |
| | | | | 1 | 1.32 | 0.14 | TSR-50 |
| | | | | 1.5 | 1.20 | 0.05 | TSR-50 |

From these experiments, it is shown that a high G-force centrifuge is capable of separating feed materials with fines below about 13% (v/v) at flow rates of up to 1.5 L/minute to produce a final solid rubber that generally meets ISO TSR-50 standards. (ISO has specified six different grades for natural rubber by which the rubber is technically specified. The grades are referred to as TSR (Technically Specified Rubber). TSR L (high quality and light colored rubber prepared from latex), TSR CV (viscosity-stabilized high quality latex rubber), TSR 5 (good quality latex rubber, darker than TSR L), TSR 10 and 20 (good quality grades derived from field coagulum, suitable for general purpose uses), TSR 50 (up to 0.50% weight dirt content. The specifications and characteristics of TSR grades are summarized in Table 4.) With a lower flow rate of 0.5 L/minute, the particular bench top centrifuge was still able to handle feed material having fines of 16.2% (v/v) when operating at the high G force setting. For feed materials with fines of 12.6% (v/v) the flow rate needed to be limited to 1 L/minute in order for the final solid rubber to meet TSR-50 and have no more than 0.5 weight % dirt and no more than 1.5 weight % ash.

TABLE 4

| | Grades | | | | | |
|---|---|---|---|---|---|---|
| Parameters | TSR CV | TSR L | TSR 5 | TSR 10 | TSR 20 | TSR-50 |
| Dirt (max) % wt | 0.05 | 0.05 | 0.05 | 0.10 | 0.20 | 0.50 |
| Ash (max) % wt | 0.60 | 0.60 | 0.50 | 0.75 | 1.00 | 1.50 |
| Nitrogen (max) % wt | 0.60 | 0.60 | 0.50 | 0.60 | 0.60 | 0.60 |
| Volatile matter (max) % wt | 0.80 | 0.80 | 0.80 | 0.80 | 0.80 | 0.80 |
| Initial wallace plasticity Po (Min) | | 30 | 30 | 30 | 30 | 30 |
| Plasticity Retention Index PRI (Min) | 60 | 60 | 60 | 50 | 40 | 30 |
| Color Lovibond Scale (individual value, max) | | 6 | | | | |
| Mooney viscosity (ML, 1 + 4, 100° C.) | 60 ± 5 | | | | | |

Example 3 (Preparation of Pellets from Guayule Shrubs)

Guayule shrubs that were approximately 7 years old were cut above the root during the winter. The cut shrubs were left in the field with the intention of drying. However, during harvest, heavy rains occurred that slowed the rate of drying.

Because of the rain, no leaf removal operation was performed, but based upon the fact that spring regrowth of leaves had not yet begun, the weight percentage of the leaves was estimated to be less than 20% (on a dry basis). Approximately 3 weeks after harvesting had begun, the cut shrubs were subjected to coarse chopping to a maximum diameter of about ⅜" (0.95 cm) using a shredder/chopper. The chopped shrub pieces were placed in covered containers and transported to a pelletizing location. Upon receipt at the pelletizing location, the containers were immediately opened. Four days after receipt of the chopped material, processing was begun (processing began approximately 4 weeks after harvest). The entire shipment of chopped guayule material was first hammer milled using a ½" screen. The resulting material was then passed over a 20 mesh vibrating screen to remove fines. The oversized material that remained on the screen was pelletized using a ¼" die. The final moisture content of the pellets was found to be 16 weight % and upon analysis (using soxhlet extraction with acetone/pentane azeotrope) the pellets were found to contain 9% resin and 4.4% rubber. The pellets were shipped in a sealed 55 gallon drum container which upon receipt was opened, nitrogen purged and re-sealed.

Example 4 (Use of Screw Press to Remove Bagasse)

A 35 pound sample of slurry was utilized. The slurry was prepared by combining pellets made from guayule plant matter (as described in Example 3, above), hexane and acetone. The pellets were analyzed by screw press approximately 2 months after pelletization. (After receipt from the pelletizing location, the pellets were stored in a 55 gallon plastic drum which had been closed, nitrogen purged and sealed.) The target composition of the slurry was 18 weight % bagasse, 57 weight % hexane, 14 weight % acetone, 5 weight % rubber and 6 weight % resin (the bagasse, rubber and resin were all from the pellets). A screw press from Vincent Corporation (model number CP-4) was utilized to separate a quantity of the bagasse from the slurry and various combinations of discharge pressure and screw speed were evaluated. Three different screens with varying shape and size mesh were also evaluated. Two screens contained slot-shaped openings (one with openings 0.017" (0.043 cm) wide and the other with 0.011" (0.028 cm) wide openings). The third screen had circular openings with a diameter of 0.023" (0.058 cm). As provided in Table 5 below, various batches of the slurry were processed through the screw pressing, using the combinations of screen press speed and back pressure indicated. Batches 1-3 used the screen with 0.017" slot-shaped openings, batches 4-12 used the screen with 0.011" slot-shaped openings and batches 13-17 used the screen with 0.023" circular openings. The liquid (liquor) containing solubilized solvents, solubilized rubber, solubilized resins and some amount of bagasse was collected from the screw press outlet. The bagasse that had accumulated into a press cake was separately collected.

For most of the batches, samples were taken from the feed slurry (also called the original slurry), the press liquor and the bagasse press cake. The weight percentages of fines and rubber in samples of press liquor were determined by subjecting samples of the press liquor to centrifuging and then the supernatant from the centrifuging to coagulation (by addition of acetone) The weight percent solvent in the bagasse press cake samples was determined by weighing the cake sample before and after drying overnight in a vacuum oven at 70° C. The solids separation efficiency was determined according to the following equation: solids separation efficiency=((% biomass in original slurry)−(% fines in press liquor))/(% biomass+water in original slurry). The liquid separation efficiency was determined according to the following equation: liquid separation efficiency=((% liquid in original slurry)-(% liquid in press cake))/(% liquid phase in original slurry). (With the liquid phase including acetone, hexane and dissolved rubber and resin.) While the percent solids in the feed slurry is known to affect the separation efficiency of the screw press, that factor was minimized in the batches analyzed because % biomass+water in the original slurry (feed slurry) were maintained at around 22%.

TABLE 5

| | | | | Analysis of liquor | | | Analysis of bagasse cake | | |
|---|---|---|---|---|---|---|---|---|---|
| Batch # | Press speed (rpm) | Back pressure (psi/Pa) | % fines | % fines adjusted* | % rubber | Solids Separation efficiency | Solvent in cake | Solvent in cake (adj)* | Liquid separation efficiency |
| 1 | 100 | 10 | 8.1 | 8.1 | — | 0.58 | — | — | — |
| 2 | 60 | 10 | 15.2 | 14.0 | 5.5 | 0.37 | — | — | — |
| 3 | 45 | 10 | 16.8 | 16.8 | 6.2 | 0.16 | — | — | — |
| 4 | 45 | 10 | 8.7 | 11.2 | 4.1 | 0.50 | 48 | 52.5 | 0.32 |
| 5 | 100 | 15 | — | — | 4.4 | — | 28.5 | 31.2 | 0.60 |
| 6 | 100 | 5 | 6.7 | 8.3 | 4.7 | 0.61 | 40 | 41.7 | 0.47 |
| 7 | 60 | 5 | 11.5 | 12.9 | 4.1 | 0.39 | 48.8 | 49.9 | 0.37 |
| 8 | 150 | 5 | 11.5 | 14.6 | 3.8 | 0.31 | 35.8 | 49.6 | 0.37 |
| 9 | 150 | 10 | 8.5 | 11.2 | 4.0 | 0.55 | 39.3 | 48.5 | 0.36 |
| 10 | 150 | 10 | — | — | — | — | — | 50.2 | — |
| 11 | 140 | 10 | 11.1 | 13.9 | 5.5 | 0.34 | 38.6 | 44.2 | 0.44 |
| 12 | 160 | 10 | 6.8 | 8.2 | 2.5 | 0.53 | 43.2 | 51.2 | 0.38 |
| 13 | 100 | 10 | 11.2 | 16.2 | 5.1 | 0.48 | 43.2 | 50.1 | 0.27 |
| 14 | 60 | 10 | 9.6 | 13.5 | 4.6 | 0.52 | 41.2 | 49.0 | 0.32 |
| 15 | 40 | 10 | 8.9 | 12.3 | 4.3 | 0.55 | 42.0 | 50.2 | 0.31 |
| 16 | 25 | 10 | 7.5 | 9.5 | 4.4 | 0.55 | 43.8 | 46.2 | 0.41 |
| 17 | 25 | 5 | 6.8 | 8.7 | 4.6 | 0.60 | 43.6 | 50.8 | 0.35 |

*The adjusted numbers take into account solvent loss that occurred from evaporation due to the fact that the machinery was not sealed (by adding back in the lost solvent). Solvent loss was calculated as slurry weight minus wet cake weight minus clarified liquid weight.

As can be seen from a review of the data in Table 5, the screw press was able to achieve greater than 50% solids separation efficiency for each type of screen operated under at least one set of conditions.

Example 5 (Use of Screw Press to Remove Bagasse)

Four gallon quantities of slurry were prepared by combining wet guayule pellets with acetone, hexane and dry rubber. Prior to preparation of the slurry, the wet guayule pellets were found to contain 11.74 weight % moisture, 6.67 weight % rubber (dry weight basis) and 8.44 weight % resin (dry weight basis). The dry rubber was obtained by coagulating a sample of Yulex guayule latex, with 1 phr Santoflex 134 antioxidant added prior to coagulation). 5.56 pounds of wet pellets were mixed with 381.47 grams of dry rubber in 14.9 pounds hexane and 3.72 pounds acetone to produce the slurry. The feed slurry contained about 19% biomass and the liquid phase of the slurry (about 81 weight %) contained about 6 weight % rubber, 2 weight % resin and 92 weight % organic solvent. Samples of the slurry were subjected to two types of screw press evaluation. The first utilized a screw press/french oil mill manufactured by the French Oil Mill Machinery Company and the second utilized a screw press manufactured by Vincent Corporation. This screw press was a Vincent Corporation screw extruder (model no. CP-4).

The liquid (liquor) containing solubilized solvents, solubilized rubber, solubilized resins and some amount of bagasse (fines) was collected from the screw press outlet. The bagasse that had accumulated into a press cake was separately collected. The liquor and bagasse were analyzed by the same procedures described above in Example 4. The liquor was found to contain 4.23 weight % fines (biomass solids), based upon the total weight of the liquor. The percentage of the liquid phase from the slurry (i.e., acetone+hexane) that was recovered as liquor was 97.88 weight %. The percentage of biomass solids from the slurry that was recovered as press cake was 82.56 weight %.

Example 6 (Use of a Decanter Centrifuge to Remove Bagasse/Fines from a Slurry)

In order to simulate the removal of rubber from a non-Hevea or guayule source, slurries of varying concentration were prepared. Each slurry utilized a co-solvent mix of 80% weight hexane and 20% weight % acetone. To each slurry was added solids (consisting of insoluble fines, mainly bagasse and dirt/soil, from previous rubber harvesting of guayule shrub), rubber (obtained from coagulation of a natural rubber latex sourced from guayule shrubs), and resin (mixed soluble resin plus degraded rubber from previous harvesting of guayule shrub) in amounts sufficient to provide the slurry compositions summarized in Table 6.

TABLE 6

(Guayule Slurry Composition)

| | % solids | % rubber | % resin |
|---|---|---|---|
| Slurry 1 | 20.8 | 3.4 | 1.6 |
| Slurry 2 | 10.2 | 3.6 | 1.6 |
| Slurry 3 | 7.2 | 3.8 | 1.6 |
| Slurry 4 | 5.2 | 3.7 | 1.6 |

Each slurry was individually fed into a decanter-type centrifuge (Westfalia Separator Model CA-225-21-000, available from GEA Westfalia Separator Group, Elgin, Illinois). Various flow rates were utilized for each slurry, ranging from 1.0 gallon/minute to 5.5 gallons/minute, as shown in Table 6. The decanter centrifuge utilized is commonly referred to as a bowl-type centrifuge because it has a bowl-like appearance, wherein the bowl allows solids to be lifted out of the liquid. Slurry enters the decanter through a central feed tube and flows into the distributor chamber. From the distributor chamber, the slurry moves through ports into the centrifugation space of the bowl where it is accelerated to operating speed. The centrifuge was set up with a differential speed set to 24 rpm and the ring dam was set to 130 millimeters; the operating bowl speed was 4750 rpm, equating to a g force of 2500. Upon operation, the solid materials adhere to the bowl wall by centrifugal force. Within the bowl is a scroll which operates at a slightly faster speed than the bowl shell, thereby continually conveying separated solids toward the narrow end of the bowl. Solids are discharged from the centrifuge through ports in the bowl shell, into the catch chamber of the housing and are ejected through a solids chute.

Samples were taken of the centrate (miscella) and solids discharge for each slurry feed and flow rate. Centrate and solids were analyzed for % fines and % solvent, respectively. A portion of the centrate from each of the slurries at each flow rate indicated in Table 6 was further treated to isolate the rubber contained therein by adding additional acetone until the rubber coagulated (generally rubber coagulation occurs at about 1.2:1 hexane/acetone weight ratio). The solvent was decanted off of the coagulated rubber and the wet rubber that remained was desolventized by drying in a vacuum oven at 70° C. Ash and dirt concentrations within the dried rubber samples were analyzed using ASTM D1278-91. Results are summarized in Table 7. The decanter centrifuge was able to remove more than 90% of the bagasse contained within each original slurry mixture, regardless of flow rate, and was also able to produce a solids content (indicated as % fines in Table 6) of less than 1% for each original slurry mixture, regardless of flow rate. Notably in many instances, the solids content of the miscella was less than 0.5 weight % or even less than 0.3 weight %. Changes in flow rates did not produce a consistent impact on the solvent content of the solids discharge.

TABLE 7

| % Fines in Slurry w/w % | Flow Rate (gallon/minute) & (liters/minute) | % Fines in Miscella w/w % | % Solvent in Solid Discharge w/w % | % Bagasse Removal w/w % | % Ash in Dry Rubber w/w % |
|---|---|---|---|---|---|
| 5.2 | 1.0 3.79 | 0.18 | 69.3 | 96[1] | 1.05 |
| | 2.0 7.57 | 0.24 | 65.3 | | 1.14 |
| | 3.0 11.36 | 0.26 | 62.7 | | 1.14 |
| 7.2 | 5.5 20.82 | 0.27 | 54.9 | — | 1.20 |
| | 4.5 17.03 | 0.40 | 56.3 | | 1.22 |

TABLE 7-continued

| % Fines in Slurry w/w % | Flow Rate (gallon/ minute) & (liters/ minute) | % Fines in Miscella w/w % | % Solvent in Solid Discharge w/w % | % Bagasse Removal w/w % | % Ash in Dry Rubber w/w % |
|---|---|---|---|---|---|
| 10.2 | 1.0 3.79 | 0.31 | 56 | 97[1] | — |
|  | 2.0 7.57 | 0.29 | 54.4 |  | 2.19 |
|  | 3.0 11.36 | 0.37 | 60.2 |  | 1.37 |
| 20.8 | 3.0 11.36 | 0.56 | 53.8 | — | 1.56 |

[1]Percentages can be considered as an average from the three flow rates.

Example 7—Hammer Milling, Roll Milling/Cracking and Flaking (Flake Milling)

Guayule shrub approximately 8-36 months old was harvested and bundled into bales. The bales were measured to have a moisture content of about 20-25%. Bales were fed to a standard wood chipper to reduce the guayule material into approximately 1" sticks. The shredded sticks of guayule were fed through a hammer mill by hand for further size reduction. The hammer mill then air conveyed the milled shrub through a fan to a cyclone separator. Varied screen sizes for the hammer mill (1", ½", ⅛", and 1/16") were used. The milled shrub was collected in bins and weighed as it was being produced.

All of the shrub was processed through a Sweco screener with a 20 mesh screen. The screener was used to remove fines from the shrub. It was tested before and/or after milling.

The milled shrub was processed in a cracker (also known as a roller mill), set up to have a differential roll speed of 1:1.1. The roll spacing on the cracker was adjustable. The cracker was fed using a vibratory screen feeder and the cracked material was collected in bins.

The cracked material was transferred to a flaker. The flaker had its own roll feeder, a differential roll speed of 1:1.25 and the roll spacing was set at 0.012". Samples of the flaked material were taken and retained for cell rupture analysis and for initial shrub rubber content. Some of the flaked material was retained to be run through the flaker a second and a third time. The flaked material was collected in bins and weighed. The final flaked material was refrigerated until it was ready to be extracted.

Determination of the % rubber and resin in samples was made using 9-10 gram samples of guayule material, soxhlet extracting for 6 hours with co-solvent (31 mL acetone, 170 mL pentane) to solubilize rubber and resin. Solubilized rubber (contained within the pentane phase) was isolated using methanol coagulation, centrifuging and drying. More specifically, 20 mL of the extract from the soxhlet extraction was transferred to a centrifuge tube and 20 mL of methanol was added to coagulate the rubber. The tube and its contents was centrifuged at 1500 rpm for 20 minutes to separate coagulated rubber from solvent. The supernatant within the tube was decanted into a flask and reserved for % resin determination. The tube and its coagulated rubber contents were rinsed with an aliquot of acetone (10 mL) and the acetone was poured out of the tube into the flask containing the decanted supernatant. The remaining coagulated rubber within the tube was then placed into a vacuum oven that had been pre heated to 60° C. and dried under vacuum for 30 minutes. After cooling to room temperature, the tube was weighed and the amount of rubber therein was calculated. Resin content (contained within the acetone phase) was determined by utilizing the flask containing the supernatant and decanted acetone. The solvent was evaporated from the flask in a fume hood until near dryness. The remaining contents were then further dried by placing the flask into an oven at 110° C. for 30 minutes. After cooling, the flask was weighed and the amount of resin remaining in the flask was calculated. Results are summarized in Table 8.

TABLE 8

| Conditions | Avg. % Moisture | Avg. % Rubber (Dry Weight Base) | Avg. % Resin (Dry Weight Base) |
|---|---|---|---|
| Shredded & Hammermilled ½" | 26.79 | 2.34 | 6.70 |
| Shredded & Hammermilled ⅛" | 22.29 | 3.12 | 6.78 |
| Shredded & Hammermilled ⅛" & 20 mesh screened & flaked | 19.67 | 4.98 | 6.96 |
| Shredded & Hammermilled ⅛" & 20 mesh screened & three passes flaked | 19.52 | 5.61 | 7.33 |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. An organic solvent-based process for the removal of rubber from guayule plant matter comprising:
   a. utilizing a slurry containing (i) guayule plant matter, the guayule plant matter comprising bagasse, rubber and resin; (ii) at least one non-polar organic solvent; and (iii) at least one polar organic solvent, wherein the slurry contains 10-50% by weight plant matter, 50-90% by weight of (ii) and (iii) combined, and wherein the at least one polar organic solvent and at least one non-polar organic solvent are present in relative weight amounts of 50-90% and 10-50%, respectively;

b. removing a majority of the bagasse from the slurry to produce a miscella and a first bagasse portion;

c. removing 80-95 weight % of bagasse from the miscella, based on the total weight of bagasse present in the miscella, to form a purified miscella and a second bagasse fraction wherein the majority of the bagasse that is removed has a particle size of less than 105 microns;

d. increasing the relative amount of polar organic solvent as compared to non-polar organic solvent within the purified miscella so as to coagulate the rubber; and e. producing solid purified rubber from the coagulated rubber where when said solid purified rubber contains 0.8 weight % volatile matter it also 0.1-4 weight % resin;

wherein at least (a)-(c) are conducted at a temperature or temperatures of 10-80° C. and a pressure of 35 to 1000 kPa.

2. The process of claim 1, wherein the at least one non-polar organic solvent in (a) and (d) consists of hexanes.

3. The process of claim 1, wherein the at least one non-polar organic solvent in (a) and (d) is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms; and combinations thereof.

4. The process of claim 1, wherein the rubber coagulated in (d) has a molecular weight of at least 1 million grams/mole.

5. The process of claim 1, wherein in (d) the relative amount of polar organic solvent as compared to non-polar organic solvent within the clarified rubber solution is increased by adding additional polar organic solvent.

6. The process of claim 1, wherein in (d) the relative amount of polar organic solvent as compared to non-polar organic solvent within the clarified rubber solution is increased by removing non-polar organic solvent.

7. The process of claim 1, wherein the rubber coagulated in (d) has a molecular weight of 1 million to 1.5 million grams/mole.

8. The process of claim 1, wherein the rubber coagulated in (d) has a molecular weight of about 1.5 million grams/mole.

9. The process of claim 1, wherein the at least one polar solvent in (a) and (d) comprises acetone.

10. The process of claim 1, wherein the at least one polar organic solvent in (a) and (d) is selected from the group consisting of alcohols having 1 to 8 carbon atoms; ethers and esters having from 2 to 8 carbon atoms; cyclic ethers having from 4 to 8 carbon atoms; ketones having from 3 to 8 carbon atoms; and combinations thereof.

11. The process of claim 1, wherein the plant matter in (a) comprises 5-20% by weight water.

12. The process of claim 1, wherein the plant matter in (a) comprises 10-20% by weight water.

13. An organic solvent-based process for the removal of rubber from guayule plant matter comprising:

a. utilizing a slurry containing (i) guayule plant matter, the guayule plant matter comprising bagasse, rubber and resin; (ii) at least one non-polar organic solvent; and (iii) at least one polar organic solvent, wherein the slurry contains 10-50% by weight plant matter, 50-90% by weight of (ii) and (iii) combined, and 0.5-10 weight % water from the plant matter, and wherein the at least one polar organic solvent and at least one non-polar organic solvent are present in relative weight amounts of 50-90% and 10-50%, respectively;

b. removing a majority of the bagasse from the slurry to produce a miscella and a first bagasse portion;

c. removing 80-95 weight % of bagasse from the miscella, based on the total weight of bagasse present in the miscella, to form a purified miscella and a second bagasse fraction wherein the majority of the bagasse that is removed has a particle size of less than 105 microns;

d. increasing the relative amount of polar organic solvent as compared to non-polar organic solvent within the purified miscella so as to coagulate rubber having a molecular weight of at least 1 million grams/mole; and e. producing solid purified rubber from the coagulated rubber where when said solid purified rubber contains 0.8 weight % volatile matter it also contains 0.1-4 weight % resin;

wherein at least (a)-(c) are conducted at a temperature or temperatures of 10-80° C. and a pressure of 35 to 1000 kPa.

14. The process of claim 13, wherein the at least one non-polar organic solvent in (a) and (d) consists of hexanes.

15. The process of claim 13, wherein the at least one non-polar organic solvent in (a) and (d) is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms; and combinations thereof.

16. The process of claim 13, wherein in (d) the relative amount of polar organic solvent as compared to non-polar organic solvent within the clarified rubber solution is increased by adding additional polar organic solvent.

17. The process of claim 13, wherein in (d) the relative amount of polar organic solvent as compared to non-polar organic solvent within the clarified rubber solution is increased by removing non-polar organic solvent.

18. The process of claim 13, wherein the rubber coagulated in (d) has a molecular weight of 1 million to 1.5 million grams/mole.

19. The process of claim 13, wherein the rubber coagulated in (d) has a molecular weight of about 1.5 million grams/mole.

20. The process of claim 13, wherein the at least one polar solvent in (a) and (d) comprises acetone.

21. The process of claim 2, wherein the at least one polar solvent in (a) and (d) comprises acetone.

22. The process of claim 13, wherein the plant matter in (a) comprises 5-20% by weight water.

23. The process of claim 13, wherein the plant matter in (a) comprises 10-20% by weight water.

24. The process of claim 1, wherein a cone-shaped fractionator is used to increase the relative amount of polar organic solvent as compared to non-polar organic solvent in (d).

* * * * *